US011985295B2

(12) United States Patent
El Kolli et al.

(10) Patent No.: US 11,985,295 B2
(45) Date of Patent: May 14, 2024

(54) METHOD FOR GENERATING CONTROL SIGNALS FOR AN IMAGE CAPTURE DEVICE

(71) Applicant: CANON KABUSHIKI KAISHA, Tokyo (JP)

(72) Inventors: Yacine El Kolli, Rennes (FR); Romain Guignard, Rennes (FR); Tristan Halna Du Fretay, Langan (FR); Lionel Tocze, Saint Domineuc (FR)

(73) Assignee: Canon Kabushiki Kaisha, Tokyo (JP)

( * ) Notice: Subject to any disclaimer, the term of this patent is extended or adjusted under 35 U.S.C. 154(b) by 178 days.

(21) Appl. No.: 17/580,420

(22) Filed: Jan. 20, 2022

(65) Prior Publication Data

US 2022/0239891 A1 Jul. 28, 2022

(30) Foreign Application Priority Data

Jan. 22, 2021 (GB) ..................................... 2100900

(51) Int. Cl.
*G06F 1/12* (2006.01)
*H04N 13/296* (2018.01)
*H04N 23/661* (2023.01)

(52) U.S. Cl.
CPC ............. *H04N 13/296* (2018.05); *G06F 1/12* (2013.01); *H04N 23/662* (2023.01)

(58) Field of Classification Search
CPC ................. G06F 1/32; G06F 9/44; G06F 1/28
See application file for complete search history.

(56) References Cited

U.S. PATENT DOCUMENTS

2004/0145400 A1\* 7/2004 Mariggis ............... H04J 3/0688
327/291
2014/0003542 A1 1/2014 Zukerman et al.
(Continued)

FOREIGN PATENT DOCUMENTS

EP 2187619 A1 5/2010
EP 3291467 A1 3/2018

OTHER PUBLICATIONS

Nikolaus Kero, Enhanced Redundancy of ST 2059-2 Time Transfer Over ST 2022-7 Redundant Networks, Technical Paper, SMPTE Motion Imaging Journal, Jun. 2019.
(Continued)

*Primary Examiner* — Keshab R Pandey
(74) *Attorney, Agent, or Firm* — Canon U.S.A., Inc. IP Division

(57) ABSTRACT

The present invention relates to a method for generating control signals for an image capture device, the method being performed in a communication device comprising a first slave time generator and a second slave time generator, the communication device being connected to a first remote time server and a second remote time server, the method comprising:

synchronizing the first slave time generator with the first remote time server;

synchronizing the second slave time generator with the second remote time server;

generating a first control signal based on the first clock, and sending the first control signal to the image capture device; and upon detecting a loss of synchronization between the first slave time generator and the first remote time server, (Continued)

generating a second control signal based on the second clock, and sending the second control signal to the image capture device.

20 Claims, 8 Drawing Sheets

(56) References Cited

U.S. PATENT DOCUMENTS

| | | |
|---|---|---|
| 2014/0281037 A1 | 9/2014 | Spada et al. |
| 2017/0250791 A1* | 8/2017 | Han ........................ H04J 3/14 |
| 2020/0233876 A1* | 7/2020 | Gvili ...................... G06F 3/065 |
| 2021/0006344 A1 | 1/2021 | Chen et al. |

OTHER PUBLICATIONS

SMPTE ST 2059-2:2015, SMPTE Profile for Use of IEEE-1588 Precision Time Protocol in Professional Broadcast Applications, The Society of Motion Picture and Television Engineers, Mar. 26, 2015.

\* cited by examiner

METHOD FOR GENERATING CONTROL SIGNALS FOR AN IMAGE CAPTURE DEVICE

CROSS REFERENCE TO RELATED APPLICATION

This application claims the benefit under 35 U.S.C. § 119(a)-(d) of United Kingdom Patent Application No. 2100900.6, filed on Jan. 22, 2021 and entitled "Method for generating control signals for an image capture device". The above cited patent application is incorporated herein by reference in its entirety.

FIELD OF THE INVENTION

The present invention relates to a method, a device, and a computer program for maintaining the generation of control signals by a communication device when a network failure occurs, thereby reducing the number of images not captured by an image capture device connected to this communication device.

BACKGROUND OF THE INVENTION

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section. Furthermore, all embodiments are not necessarily intended to solve all or even any of the problems brought forward in this section.

Video systems allowing a user to interactively control a viewpoint and generate new views of a dynamic scene from any 3D position have received increasing attention during last years. Such systems involve capturing a scene from a plurality of viewpoints, using a plurality of image capturing apparatuses (e.g. cameras) placed at different positions. A virtual viewpoint content may then be generated from the images captured from the plurality of viewpoints, offering the user a better sense of realism.

The quality of the reconstructed images relies, among other parameters, on the synchronization precision of all the image capturing apparatuses: all the image capturing apparatuses must activate their respective shutter simultaneously, to avoid inconsistencies and artefacts in the reconstructed sequence of images. Furthermore, the images simultaneously captured by all the image capturing apparatuses must have the same timecode value. It is recalled that timecodes are classically used in the post-processing of data received from image capture devices, in particular for synchronizing frames corresponding to a capture of the scene by the different image capture devices at a same time. For instance, the SMPTE 12M specification defines several possible formats for time codes, including Linear Timecode (LTC), Vertical Interval Timecode (VITC) or Ancillary Timecode (ATC).

The plurality of image capturing apparatuses is generally set up all around the scene (e.g. a sports field), and the distance between two image capturing apparatuses can be very large. Because of that, it is not possible to connect all the image capturing apparatuses to a central image processing device by a conventional image capture interconnect technology, such as Serial Digital Interface (SDI). Therefore, it is necessary to use digital networking technologies, such as Ethernet. The SMPTE standard 2059-1 defines how to synchronize multiple image capturing apparatuses connected to an Ethernet network. In particular, the SMPTE standard 2059-1 teaches how to generate SDI interface signals on multiple video processing devices connected a same network, so that the video timing of all video processing devices are phase aligned.

As mentioned above, it is necessary to use digital networking technologies, such as Ethernet, and therefore to use long network cables combined with daisy chained topology. However, stadium environment may be harsh and network cables may suffer temporary or permanent damages, while the coverage of the sporting event must continue without interruption. The generation of synchronization signals to control an image capture apparatus must not be interrupted (or as short a time as possible) when such failure occurs.

There are solutions of the prior art for ensuring the continuity (or minimizing the interruption) of image capture in case of network or time server failure, which are mostly based on duplicating all or part of the hardware, such as network cables, time server apparatus, synchronization devices (whole, or only their network interfaces), etc. Thanks to this hardware redundancy, the image capturing apparatuses maintain physical connectivity with the time server. Furthermore, network time synchronization protocols implement mechanisms for recovering synchronization after a network failure when a backup (or redundant) path and/or time server is available. In case of IEEE 1588 v2 protocol, this management mechanism is called BMCA (for "Best Master Clock Algorithm"). According to this mechanism, when a network and/or time server failure occurs, the protocol stack times out because the time server is not reachable. A new Grand Master is then elected and used as a time server for all the synchronization devices (when the failure is a network failure and a backup path exists, the previous time server may be elected since it remains reachable). Then, all the synchronization devices (also called "synchronization signal output apparatuses" or "communication device" in the following) perform network time synchronization with either the new elected time server or the same time server through a different network path (i.e. the backup path).

However, these solutions have drawbacks.

On the one hand, duplicating the hardware may be very costly (e.g., when the whole synchronization device is duplicated). On the other hand, switching from one equipment to a backup equipment can be very long compared to the targeted applications. For instance, in the BMCA mechanism, electing a new Grand Master may last from a few seconds to 30 seconds depending on the spanning tree algorithm used. During this time, the image capturing apparatuses is out of synchronization and no images are captures. At 60 images per seconds for instance, that can represent the loss of thousands of images.

There is thus a need for a method for maintaining the generation of synchronization signals in the event of one or several successive failure(s), which does not suffer from the problems mentioned above.

SUMMARY OF THE INVENTION

It is provided a method for generating control signals for an image capture device, the method being performed in a communication device comprising a first slave time generator associated with a first clock and a second slave time generator associated with a second clock. The method may comprise:

synchronizing the first clock with a reference time of a first remote time server to which the communication device is connected;

synchronizing the second clock with a reference time of a second remote time server to which the communication device is connected;

generating a first control signal based on the first clock, and sending the first control signal to the image capture device;

upon detecting a loss of synchronization between the first slave time generator and the first remote time server, generating a second control signal based on the second clock, and sending the second control signal to the image capture device.

By "slave time generator", it is meant an entity associated with a respective clock, configured for generating clock signals based on its respective clock. Control signals for controlling an image capture device may then be generated from these clock signals.

When a failure occurs, i.e., a loss of synchronization is detected, the reference clock used for generating the control signals is changed to advantageously ensure a continuity in the generation of control signals. Such method enables the generation of control signals resilient to failures, in particular to successive failures, without having to duplicate all hardware. The change of reference clock for generating the control signals takes place transparently and almost instantaneously, which minimizes—or even eliminates—frame losses. Therefore, the above method is fast, robust to failures, and relatively inexpensive.

Other additional and optional features of the method are recited in dependent claims 2 to 12.

In the dependent claims, by "time source" it is meant a time or a time entity from which the reference time of the time server is derived. For instance, the time source may be a GNSS (for "Global Navigation Satellite System") time, for instance a GPS time, or an atomic clock, for instance a Cesium atomic clock.

Another aspect of the disclosure relates to a computer program product for a programmable apparatus, the computer program product comprising a sequence of instructions for implementing one or several embodiments of the above method, when loaded into and executed by the programmable apparatus.

Yet another aspect of the disclosure relates to a computer-readable storage medium storing instructions of a computer program for implementing one or several embodiments of the above method.

It is also provided a communication device for generating control signals for an image capture device, the communication device being connected to a first remote time server and a second remote time server. This communication device may comprise:

a first slave time generator configured for synchronizing a first clock with a reference time of the first remote time server;

a second slave time generator configured for synchronizing a second clock with a reference time of the second remote time server;

a control signal generator configured for generating a first control signal based on the first clock;

an output interface configured for sending the first control signal to the image capture device; and a synchronization controller for detecting a loss of synchronization between the first slave time generator and the first remote time server;

wherein the synchronization controller is further configured for causing, upon detecting the loss of synchronization between the first slave time generator and the first remote time server, the control signal generator to generate a second control signal based on the second clock;

wherein the output interface is further configured for sending the second control signal to the image capture device.

It is also provided an image capture system comprising a first remote time server, a second remote time server, a plurality of image capture device and a plurality of communication devices, each communication device being configured for generating control signals for a respective image capture device, wherein each communication device is connected to the first remote time server and the second remote time server, wherein each communication device may comprise:

a first slave time generator configured for synchronizing a first clock with a reference time of the first remote time server;

a second slave time generator configured for synchronizing a second clock with a reference time of the second remote time server;

a control signal generator configured for generating a first control signal based on the first clock;

an output interface configured for sending the first control signal to the respective image capture device;

a synchronization controller for detecting a loss of synchronization between the first slave time generator and the first remote time server;

wherein the synchronization controller is further configured for causing, upon detecting the loss of synchronization between the first slave time generator and the first remote time server, the control signal generator to generate a second control signal based on the second clock; and wherein the output interface is further configured for sending the second control signal to the respective image capture device.

Since the present invention can be implemented in software, the present invention can be embodied as computer readable code for provision to a programmable apparatus on any suitable carrier medium. A tangible carrier medium may comprise a storage medium such as a floppy disk, a CD-ROM, a hard disk drive, a magnetic tape device or a solid state memory device and the like. A transient carrier medium may include a signal such as an electrical signal, an electronic signal, an optical signal, an acoustic signal, a magnetic signal or an electromagnetic signal, e.g., a microwave or RF signal.

Other features and advantages of the method and apparatus disclosed herein will become apparent from the following description of non-limiting embodiments, with reference to the appended drawings.

BRIEF DESCRIPTION OF THE DRAWINGS

Some embodiments of the present invention are illustrated by way of example, and not by way of limitation, in the figures of the accompanying drawings, in which like reference numerals refer to similar elements and in which.

DETAILED DESCRIPTION OF THE INVENTION

Figure 2:
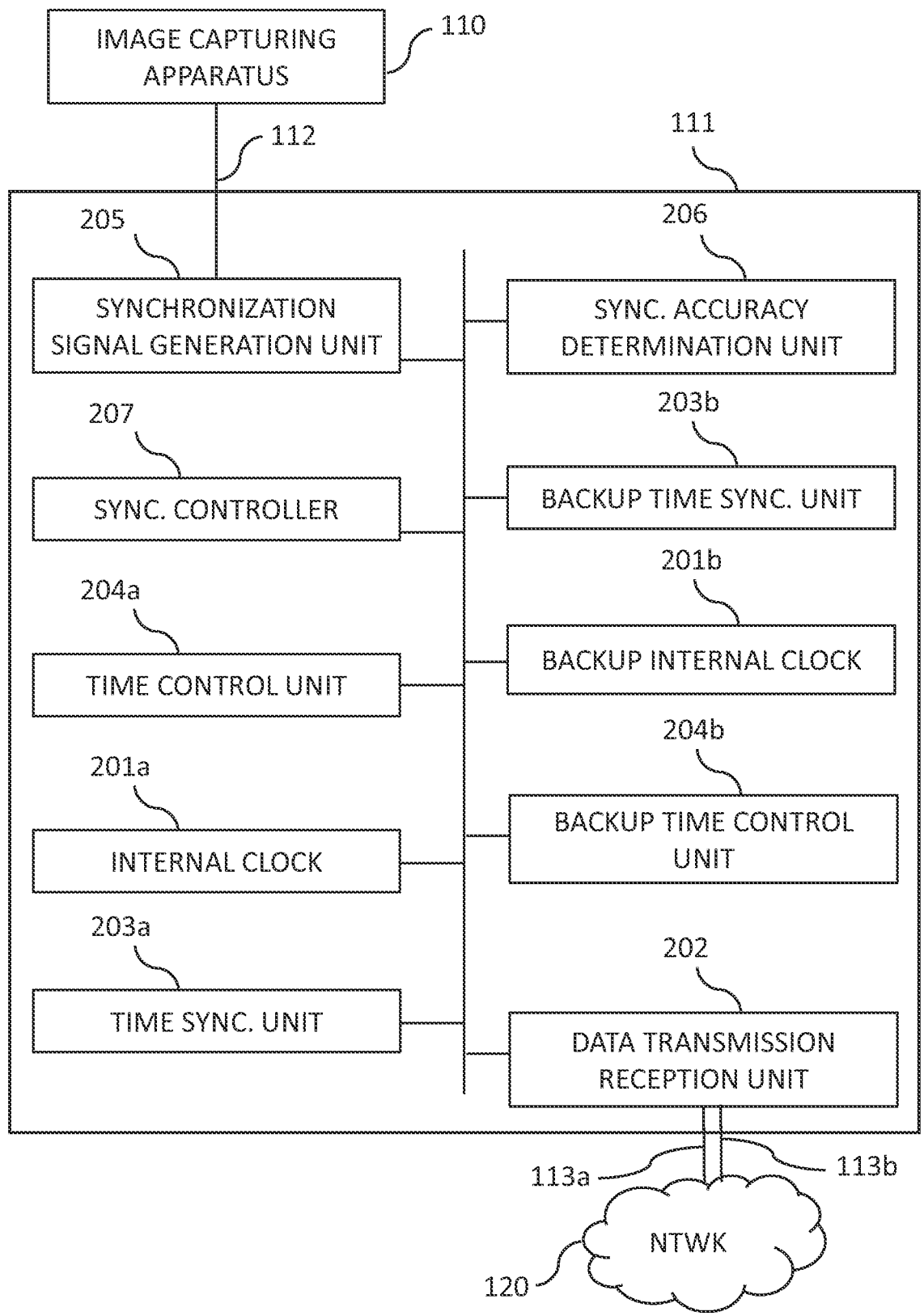
FIG. 2 is a block diagram showing an example of an arrangement of a synchronization signal output apparatus in one or several embodiments.
Figure 6A:
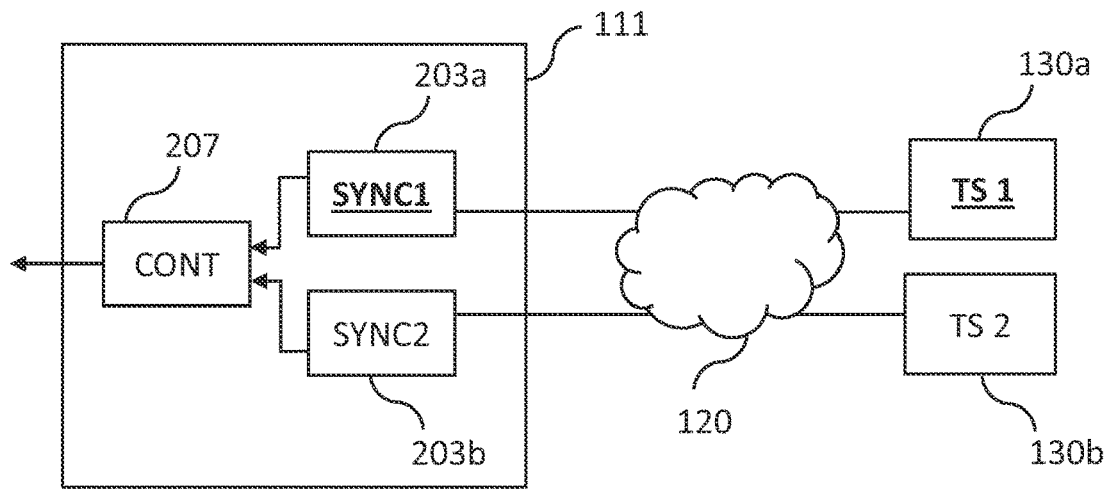
FIGS. 6a, 6b and 6c illustrate an example of generation of synchronization signals by a synchronization signal output apparatus in case of successive network failures, in one or several embodiments.
Figure 6B:
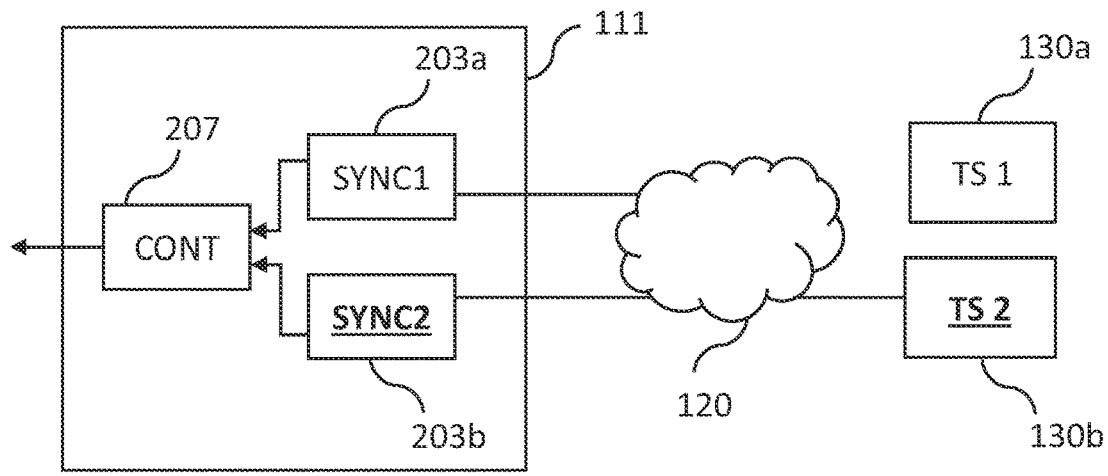
Figure 6C:
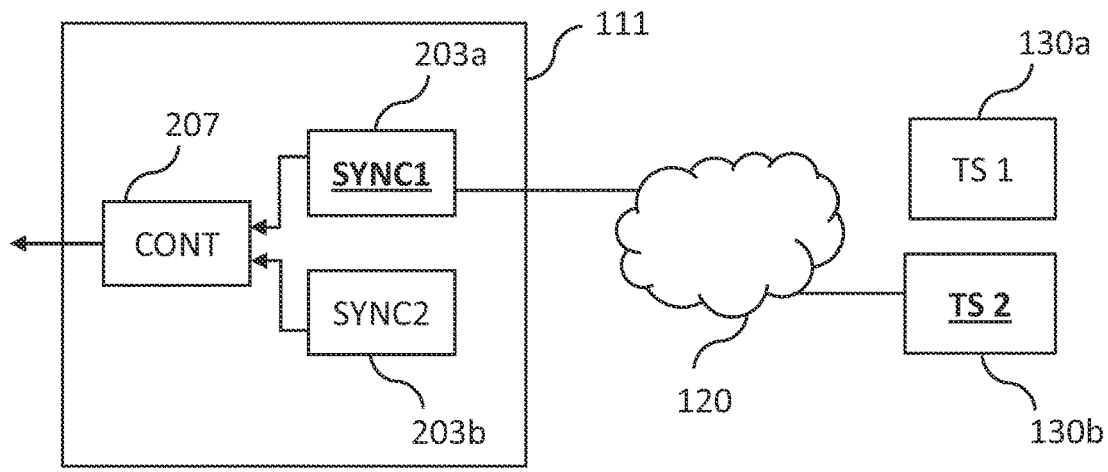

According to embodiments, the invention proposes to duplicate only certain elements of an image capture system to maintain reliably image capture in the event of failures. More specifically, the system may use two time servers for providing a time reference so that all capture devices are synchronized with each other. Also, the communication devices, which control the capture times of the image capture devices, each has two slave time generators that can be used for generating control signals for the image capture devices. Schematically, a slave time generator is an entity associated with a clock, capable of generating clock signals from which control signals may be generated for image capture devices. In the example of FIG. 2, a slave time generator may comprise a time synchronization unit 203a (resp. 203b) and an internal clock 201a (resp. 201b). The slave time generator may also comprise a time control unit 204a (resp. 204b). When possible, the two slave time generators are synchronized with a respective time server, even if only one of these slave time generators is used to generate the control signals. Thus, in the event of loss of synchronization between the slave time generator currently used and the respective time server, it is possible to use the other slave time generator almost instantaneously (since the latter is already synchronized with a time server). Therefore, continuity of image capture is ensured. As shown in the example of FIGS. 6a-c, such a system is very robust to successive failures, without the need to duplicate all the components (e.g., the whole control device, as in solutions of the prior art).

Figure 1A:
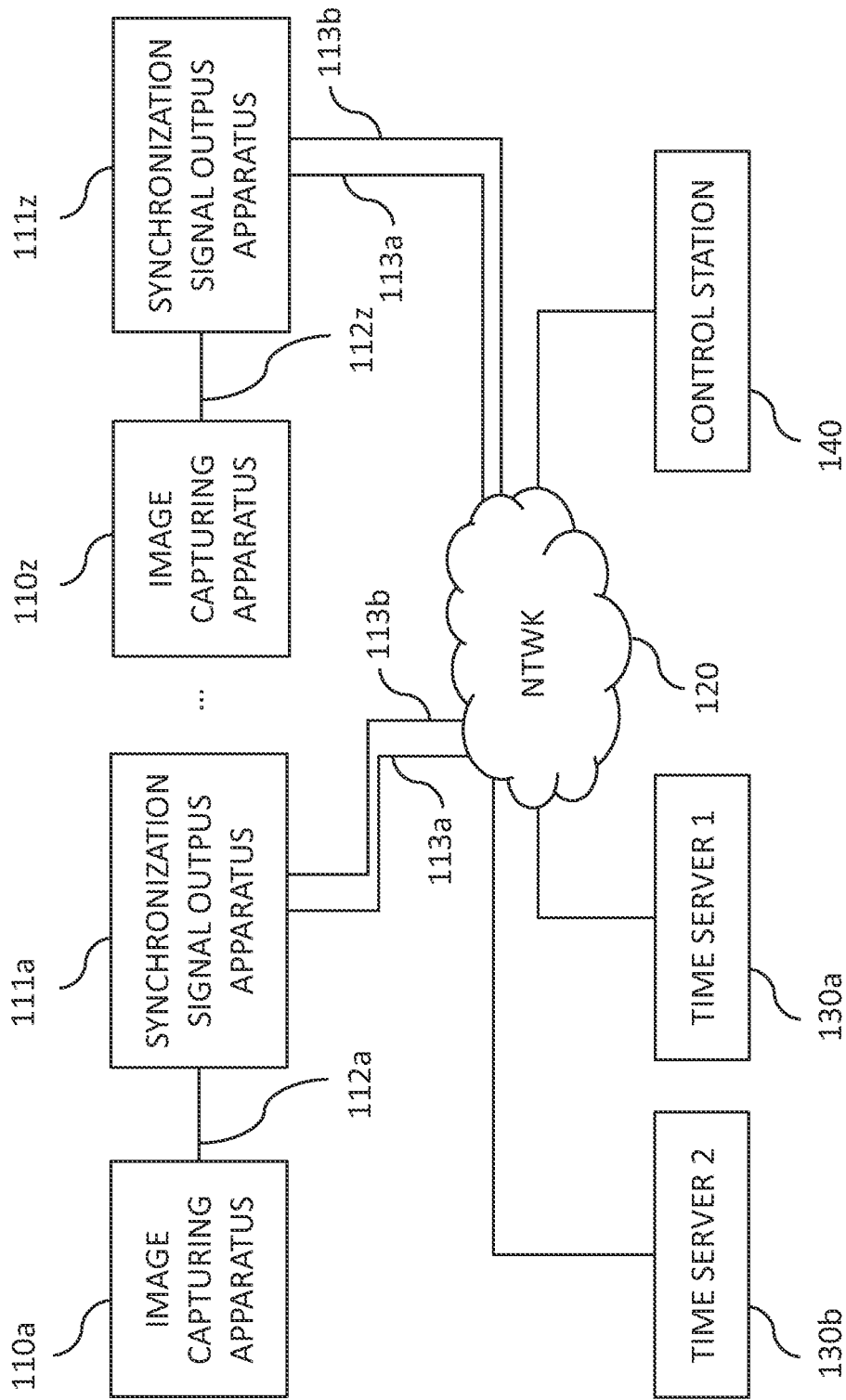
FIGS. 1*a* and 1*b* represent an example of configuration of a system in which some embodiments of the present invention can be used.

FIG. 1a represents an example of configuration of a system wherein some embodiments of the present invention can be used. This system includes a plurality of image capturing apparatuses 110a to 110z and a plurality of synchronization signal output apparatuses 111a to 111z respectively corresponding to the plurality of image capturing apparatuses 110a to 110z. The plurality of image capturing apparatuses 110a to 110z may be connected to the corresponding synchronization signal output apparatuses 111a to 111z using respective wired lines or wireless channels 112a to 112z. In the following, the image capturing apparatuses 110a to 110z, the synchronization signal output apparatuses 111a to 111z and the wired lines or wireless channels 112a to 112z may be generically referred to as image capturing apparatuses 110, synchronization signal output apparatuses 111 and wired lines or wireless channels 112, respectively, when it is unnecessary to distinguish them.

The system may also comprise a primary time server 130a and a backup time server 130b. The terms "primary" and "backup" are used here to distinguish the two time servers 130a, 130b. In one or several embodiments, the primary time server 130a may correspond to the time server preferentially used to provide a time reference to the synchronization signal output apparatuses 111. In other words, the primary time server 130a is used when it is reachable/available. In these embodiments, the backup time server 130b may be used as time reference when the primary time server 130a is unreachable/unavailable.

In addition, the system may comprise a generation unit (not shown) that generates a virtual viewpoint image (or a virtual viewpoint video) based on a plurality of captured images (or captured videos) obtained by performing image capturing from a plurality of directions by the plurality of image capturing apparatuses 110.

Each of the plurality of synchronization signal output apparatuses 111 may be connected to the current time server 130a or 130b via a network 120. By "current" time server, it is meant the time server 130a or 130b used at a given time for synchronizing a clock of a synchronization signal output apparatus 111. The network 120 may be for example a star topology Ethernet network, or a daisy chained Ethernet network, or any kind of network compatible with the synchronization protocol. The synchronization signal output apparatuses 111 may be connected to the network 120 via at least two physical links 113a and 113b, allowing keeping a physical connectivity to the time servers 130a and/or 130b in case one link 113a, 113b fails.

Figure 1B:
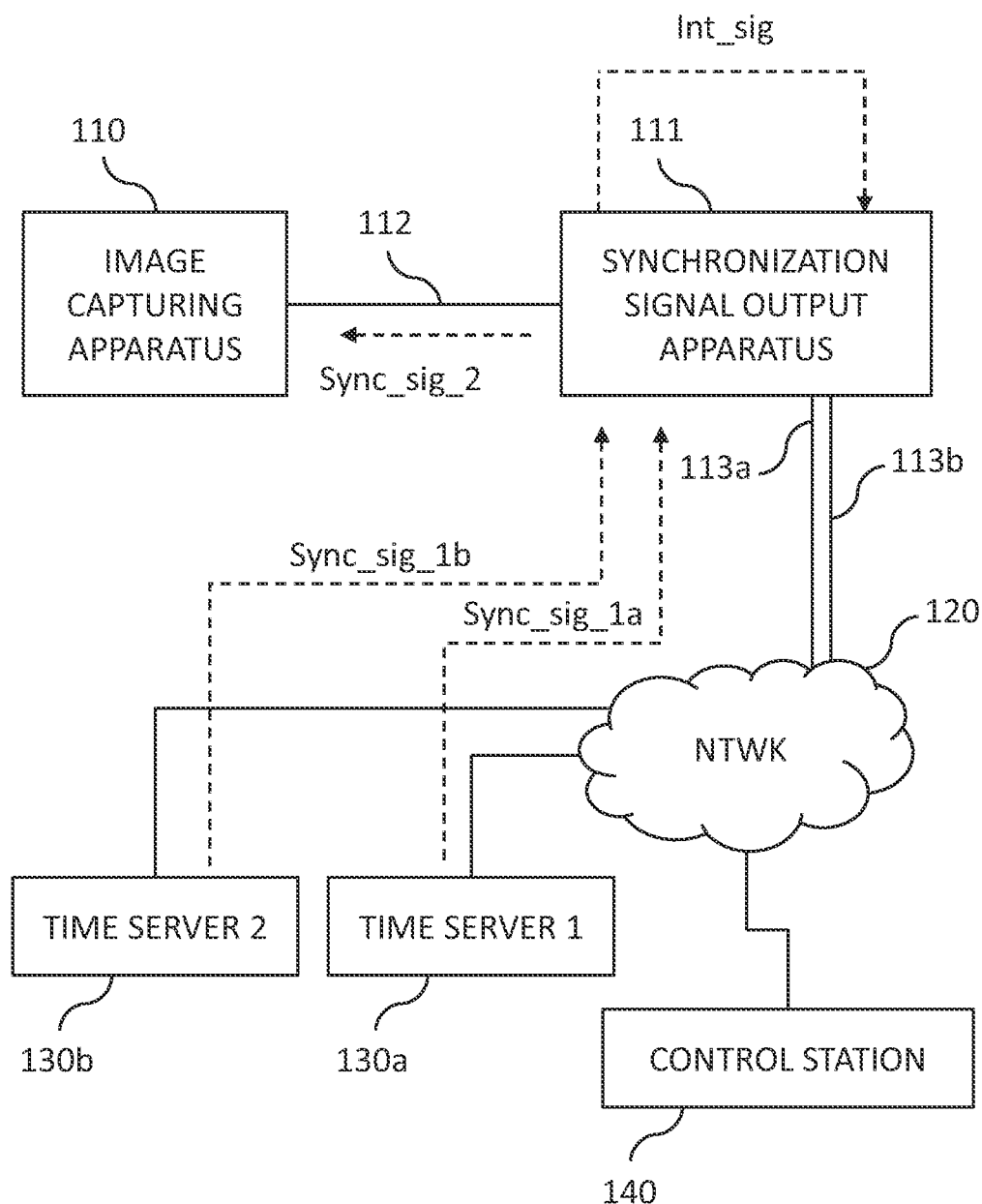

The image capture scheme is schematically represented in FIG. 1b.

During a clock synchronization mechanism, for each synchronization signal output apparatus 111 of the system, a respective clock of the synchronization signal output apparatus 111 may be synchronized to a reference time held by a current time server 130a or 130b. For instance, this first synchronization mechanism may be carried out by using first synchronization signals ("Sync_sig_1a", "Sync_sig_1b" in FIG. 1b) respectively outputted from the current time server 130a or 130b to the synchronization signal output apparatuses 111.

In one or several embodiments, this clock synchronization mechanism may be carried out using a time synchronization protocol such as NTP (for "Network Time Protocol") or IEEE 1588 PTP (for "Precision Time Protocol"), as set forth in the document entitled "IEEE Standard for a Precision Clock Synchronization Protocol for Networked Measurements and Control Systems" by IEEE Instrumentation and Measurements Society, Jul. 24, 2008.

Then, the synchronization signal output apparatus 111 may control the image capturing apparatus 110 to which it is connected so that it begins capturing images of a scene at a given time. This can be performed by outputting, by the synchronization signal output apparatus 111, second synchronization signals ("Sync_sig_2" in FIG. 1b) to the respective image capturing apparatus 110. Upon receiving the synchronization signal, the respective image capturing apparatus 110 may start capturing the image sequence. In alternative embodiments, a control command might be used to instruct the image capturing apparatus 110 to start capturing the image sequence, if provided by the protocol used.

In one or several embodiments, this generation of second synchronization signals may be carried out using the Serial Digital Interface (SDI) Genlock and timecode mechanisms.

The time at which a second synchronization signal is generated (and sent to the image capturing apparatus 110) is referred to as "start target time" hereinafter. This start target time corresponds to the time at which the image capture by the respective image capturing apparatus 110 starts. In one or several embodiments, the start target time may be provided by a control apparatus (or "control station") 140, as further detailed below.

Schematically, the synchronization signal output apparatus 111 may be divided into two main units: a first synchronizing unit for synchronizing the value of the clock of the apparatus to the value of the reference time held by the current time server 130a or 130b, and a second synchronizing unit for generating and outputting synchronization signals in order to control the image capturing apparatus 110. The second synchronization unit may be synchronized with the first synchronization unit via an internal signal ("Int_sig" in FIG. 1b) which will be described in detail below, with reference to FIG. 2. A detailed description of the components of the synchronization signal output apparatus 111 will also be provided below with reference to FIG. 2. It is noted that, referring to FIG. 2, the first synchronization unit may comprise at least the internal clocks 201a and 201b, and the second synchronization unit may comprise at least the synchronization signal generation unit 205.

When all the synchronization signal output apparatuses 111 align timings of starting to output the synchronization signals to their respective image capturing apparatuses 110, all the image capturing apparatuses 110 can start capturing a respective sequence of images at the same time, in synchronism with each other.

In one or several embodiments, the second synchronization signals may be signals in a form processed as "Generator Lock" (or "Genlock") signals in the image capturing apparatuses 110. It is recalled that a Genlock signal is a type of signal commonly used in the video systems for synchronization processing: generally, the Genlock signal is received by each device (cameras, production switchers, etc.) and used as a timing reference for the internal video handling performed by the device, and for synchronous output.

It is noted that the terms "first" and "second" synchronization signals have no specific technical meaning, and are used only for the sake of clarity, to distinguish the types of signals. Subsequently, these terms may be omitted if there is no reasonably possible confusion.

In one or several embodiments, a control apparatus 140 may be used for controlling time at which the plurality of synchronization signal output apparatuses 111 output the synchronization signals to the respective image capturing apparatus 110. The synchronization output apparatuses 111 may be connected to the control apparatus 140 via the network 120, or via another dedicated network.

For example, the control apparatus 140 may notify each synchronization signal output apparatus 111 of the time (i.e., the "start target time") at which the synchronization signal is output, and the synchronization signal output apparatus 111 can start to output the synchronization signal at the notified time. Since the synchronization signal output apparatuses 111 have established time synchronization with the current time server 130a or 130b, when the control apparatus 140 instructs synchronization signal transmission start time, the plurality of synchronization signal output apparatuses 111 can align timings of starting to output the synchronization signals. It is noted that, after the start of outputting the synchronization signal, each synchronization signal output apparatus 111 can continue outputting the synchronization signal while correcting a timing of generating the synchronization signal based on the time synchronized with the time server 130. This allows the plurality of image capturing apparatuses 110 to perform image capturing at the common timing while ensuring time synchronization.

Furthermore, simultaneously with the synchronization signal, a time code may be sent from the synchronization signal output apparatus 111 to the respective image capturing apparatus 110. Time codes are generally used in the post-processing of the captured image sequences, e.g., for synchronizing frames corresponding to a capture of the scene by the different image capturing apparatuses 110 at a same time. Any appropriate format may be used, for instance the formats defined by SMPTE ST 12-1, which are traditionally encoded in Linear Time Code (LTC), Vertical Interval Time Code (VITC) or Ancillary Time Code (ATC) variants.

For instance, the control apparatus 140 may send a respective message (hereinafter referred to as "START_TARGET_TIME message") to each of the synchronization signal output apparatuses 111. Each START_TARGET_TIME message may include a first parameter indicating the start target time, i.e., the time to start the capture of the scene by the respective image capturing apparatus 110. Advantageously, the START_TARGET_TIME message may also include a second parameter corresponding to the start timecode associated with the captured image or sequence of images. The start time code may indicate for instance the value of the time code associated with the first frame of the image sequence to capture.

In one embodiment, the start target time parameter may be formatted in accordance with the PTP time representation as defined in the IEEE 155-2008 standard, and the start time code parameter may be formatted in accordance with the ST 12-1: 2014 SMPTE Standard.

Time servers 130a, 130b may be servers that distribute, via the network 120, information of the current time held in the self-apparatus (i.e., the time server 130), in accordance with a protocol such as NTP or IEEE 1588 PTP. For example, time servers 130a, 130b may obtain the current time from GPS, a standard radio wave, or an atomic clock, and distribute the obtained current time. Alternatively, time servers 130a, 130b may distribute, as time information, information of an elapsed time after the time set in the self-apparatus (i.e., the time servers 130a, 130b). The protocol used when time servers 130a, 130b distribute the time information is not limited to NTP or PTP, and other suitable protocols may be used.

The image capturing apparatus 110 is an apparatus that performs image capturing based on the synchronization signal received from the synchronization signal output apparatus 111. It is noted that the image capturing apparatus 110 can perform image capturing without using the synchronization signal. However, when performing image capturing in synchronism with another image capturing apparatus 110, the image capturing apparatus 110 establishes time synchronization with the other image capturing apparatus 110 using, for example, the synchronization signal according to this embodiment. A video captured by the image capturing apparatus 110 may be either a moving image or a still image, and may include data such as a sound. The video captured by the image capturing apparatus 110 can be saved in a storage incorporated in the image capturing apparatus 110 or in the synchronization signal output apparatus 111, in a server accessible via the network 120, or in a storage on a cloud. It is possible to generate a virtual viewpoint content based on videos synchronously captured by the plurality of image capturing apparatuses 110 and accumulated. Alternatively, videos captured by the image capturing apparatuses 110 may be used to generate a free viewpoint content in real time without being saved in a storage.

The network 120 is a communication network that allows transmission/reception of signals between the apparatuses such as the synchronization signal output apparatuses 111 and the time server 130a or 130b via a communication link 113a or 113b, such as a wired line, a wireless channel using Wi-Fi®, Bluetooth®, or the like, or a combination thereof. The network 120 may include a relay apparatus such as a hub, a wireless LAN station, or a PC that can relay data between the plurality of synchronization signal output apparatuses 111 and the time servers 130a, 130b. It is noted that, in the example of FIG. 1a, each of the plurality of synchronization signal output apparatuses 111 is connected to the network 120. However, the present invention is not limited to this architecture. For example, the system may be configured so that the plurality of synchronization signal output apparatuses 111 may be cascade-connected and one of the plurality of synchronization signal output apparatuses 111 is connected to the time server 130a, 130b via the network 120.

The line or channel 112 may be a coaxial cable such as a BNC cable that connects the synchronization signal output apparatus 111 and the corresponding image capturing apparatus 110. Of course, different kinds of wired line, or wireless channels may be used, such as close proximity wireless communication.

It is noted that FIGS. 1a and 1b illustrate an example in which the synchronization signal output apparatus 111 and the image capturing apparatus 110 are formed as separate apparatuses. However, in one or several embodiments, the synchronization signal output apparatus 111 and the image capturing apparatus 110 may be formed as a single apparatus by, for example, including the synchronization signal output apparatus 111 in the image capturing apparatus 110. Also, even if the example of FIG. 1a includes a plurality of synchronization signal output apparatuses 111, each of them being respectively associated with one image capturing apparatus 110, there may be only one synchronization signal output apparatus 111 configured for outputting respective synchronization signals to the plurality of image capturing apparatuses 110. Alternatively, there may be more than one synchronization signal output apparatuses 111, each of the synchronization signal output apparatuses 111 being configured for outputting synchronization signals to a respective subset of image capturing apparatuses 110 among the plurality of image capturing apparatuses 110. In other words, the number of synchronization signal output apparatuses 111 is not limited.

FIG. 2 is a block diagram showing an example of an arrangement of a synchronization signal output apparatus 111 in one or several embodiments.

The arrangement shown in FIG. 2 can be implemented when, for example, one or more processors such as a CPU (for "central processing unit") executes a program stored in a storage device such as a ROM (for "read only memory") or RAM (for "random access memory"), unless otherwise specified. As the processor, for example, a processor other than a CPU, such as an ASIC (Application Specific Integrated Circuit), FPGA (Field Programmable Gate Array), or DSP (Digital Signal Processor) may be used. The example of the arrangement shown in FIG. 2 is presented for the descriptive purpose. Other functional components may be included in addition to functions shown in FIG. 2. If possible, at least some of the functions shown in FIG. 2 may be omitted/integrated.

In one or several embodiments, the synchronization signal output apparatus 111 may include a primary internal clock 201a and a backup internal clock 201b, a data transmission/reception unit 202, a primary time synchronization unit 203a, a backup time synchronization unit 203b, a primary time control unit 204a and a backup time control unit 204b, a synchronization signal generation unit 205, a synchronization accuracy determination unit 206, and a synchronization controller 207. The terms "primary" and "backup" are used for distinguish the different components. Schematically, the primary internal clock 201a, the primary time synchronization unit 203a and the primary time control unit 204a may be seen as parts of a first slave time generator and the backup internal clock 201b, the backup time synchronization unit 203b and the backup time control unit 204b may be seen as parts of a second slave time generator, a "slave time generator" being used for generating synchronization signals for the image capturing apparatuses 110. Typically, the second slave time generator is a duplication of the first slave time generator, and both can be used equally to generate the synchronization signals (i.e., the first slave time generator is not necessarily the preferred one). When the two slave time generators are synchronized with a respective time server 130a, 130b (which can be the same time server or two distinct time servers), the slave time generator to be used for generating synchronization signals may be chosen according to a predefined rule (e.g. "selecting the first slave time generator preferentially").

Each of the primary internal clock 201a and the backup internal clock 201b may be, for example, a hardware clock holding the current time. For example, based on a hardware clock, the internal clock 201a, 201b currently used may periodically output a reference signal as a time reference in the synchronization signal output apparatus 111.

The data transmission/reception unit 202 may transmit/receive data to/from the current time server 130a, 103b via the network 120. The data transmission/reception unit 202 can be, for example, a NIC (Network Interface Card). However, the present invention is not limited to this, and another component capable of transmitting/receiving data to/from the time servers 130a, 130b may be used. The data transmission/reception unit 202 complies with, for example, the IEEE 1588 standard and has a function of saving a timestamp obtained when transmitting/receiving data to/from the time servers 130a, 130b. In some embodiments, the function of the internal clocks 201a, 201b may be included in the data transmission/reception unit 202. The data transmission/reception unit 202 may, for instance, implement two Ethernet ports connected to the network 120. For example, the data transmission/reception unit 202 may have a primary network interface attached to the primary time synchronization unit 203a, and a backup network interface attached to the backup time synchronization unit 203b.

For example, according to a method complying with the IEEE 1588 standard, a time synchronization unit 203a (resp. 203b) may obtain time information from a time server 130a, 103b, and synchronize the internal clock 201a (resp. 201b) with the time in the time server 130a, 130b. It is noted that the time synchronization unit 203a (resp. 203b) may establish time synchronization with the time server 130a, 130b by a proprietary protocol or another standard such as the NTP or Ethernet AVB standard, instead of the IEEE 1588 standard. Even if the IEEE 1588 standard is used, the time synchronization units 203a, 203b may comply with the current or future standard such as IEEE 1588-2002 or IEEE 1588-2008. It is also noted that the standard for time synchronization by IEEE 1588-2008 is also called PTPv2 (Precision Time Protocol Version 2). For example, the time synchronization unit 203a (resp. 203b) can calculate an error (offset) with respect to the time of the time server 130a, 130b by transmitting/receiving data to/from the time server 130a, 130b and calculating a transmission delay between the time server 130a, 130b and the synchronization signal output apparatus 111. The time synchronization unit 203a (resp. 203b) may hold the calculated error, and supply information of the error to the time control unit 204a (resp. 204b), the synchronization accuracy determination unit 206 and/or the synchronization controller unit 207.

The time control unit 204a (resp. 204b) may adjust the internal clock 201a (resp. 201b) based on the time of the time server 130a, 130b obtained by the time synchronization unit 203a (resp. 203b) and the time error between the time server 130a, 130b and the synchronization signal output apparatus 111. For example, the time control unit 204a (resp. 204b) may define a threshold for the error with respect to the time held by the time server 130a, 130b. If the error is larger than the threshold, the time control unit 204a (resp. 204b) largely changes the time of the internal clock 201a (resp. 201b); otherwise, the time control unit 204a (resp. 204b) may gradually correct the time of the internal clock 201a (resp. 201b).

In the following, the formulation "synchronization of a time synchronization unit 203a, 203b with a time server 130a, 130b" may be used for designating the synchronization of the internal clock 201a, 201b with the reference time of the time server 130a, 130b. It is noted that the primary time synchronization unit 203a may be synchronized to either the primary time server 130a or the backup time server 130b (i.e., the primary time synchronization unit 203a is not necessarily synchronized with the primary time server 130a). Similarly, the backup time synchronization unit 203b may be synchronized to either the primary time server 130a or the backup time server 130b (i.e., the backup time synchronization unit 203b is not necessarily synchronized with the backup time server 130b).

The synchronization signal generation unit 205 may generate a synchronization signal, and output it to the image capturing apparatus 110. In one or several embodiments, the synchronization signal may be for example a Genlock signal conforming to the SMPTE 274M standard, and/or a Linear Time Code (LTC) time code in accordance to the SMPTE ST 12-1 specification. However, the present invention is not limited to this, and an arbitrary periodic signal can be used as a synchronization signal. The synchronization signal generation unit 205 may include, for example, a crystal oscillator such as a VCXO (for "Voltage Controlled Crystal Oscillator") or TCXO (for "Temperature Compensated Crystal Oscillator"), and a ceramic resonator. The synchronization signal generation unit 205 may include a PLL (for "Phase Locked Loop") formed by combining a phase comparator and the like for generating a stable synchronization signal. Furthermore, to improve the accuracy, the synchronization signal generation unit 205 may be configured to apply in advance a correction value for correcting the individual difference of the crystal oscillator. It is noted that, if possible in terms of downsizing/simplification of a circuit, the synchronization signal generation unit 205 may use a high-accuracy atomic clock or the like.

In one or several embodiments, the synchronization signal generation unit 205 may generate an internal signal of the same frequency as that of the reference signal generated by the internal clock 201a or 201b, and adjust a timing of generating a synchronization signal based on a phase difference between the internal signal and the reference signal. If a jitter of the reference signal generated by the internal clock 201a (resp. 201b) is large, that is, for example, a jitter of the transmission delay with respect to the time server 130a, 130b is large, a fluctuation of the frequency of the reference signal generated by the internal clock 201a (resp. 201b) is large. As a result, the phase difference between the internal signal and the reference signal fluctuates. If the phase difference is fed back to the internal signal, the generation timing of the synchronization signal may largely fluctuate. Consequently, the image capturing apparatus 110 may not be able to perform image capturing stably.

The synchronization accuracy determination unit 206 determines the magnitude of the time error between the time server 130a, 130b and the synchronization signal output apparatus 111, that is held in the time synchronization unit 203a (resp. 203b). Then, in accordance with the determination result, the synchronization accuracy determination unit 206 may set an adjustment mode of the internal signal generated by the synchronization signal generation unit 205.

The synchronization controller 207 is configured for enabling and phase aligning the synchronization signal generation unit 205, to allow synchronization signals to be outputted from the synchronization signal generation unit 205 to the image capture apparatus 110 according to start target times or new target times. Therefore, image capture may be started or restarted according to these times. In particular, the synchronization controller 207 may interact with the synchronization signal generation unit 205 by providing times (called "alignment points", "start target times", "start times" or "target times"), either to start or to re-align the synchronization signal carried on the line or channel 112. The output signal start time may be controlled after a power up while it is realigned after recovery from a failure. The synchronization signals carried on the line or channel 112 may include a genLock signal and, for example, an ST 12-1 LTC timecode.

In one or several embodiments, the synchronization controller 207 may transmit the following parameters to the synchronization signal generation unit 205:

a "start clock synchronization time", indicating the target time for generating or re-aligning the (second) synchronization signals transmitted from the synchronization signal output apparatus 111 to the respective image capturing apparatus 110 on the line or channel 112;

a "start clock synchronization timecode", defining the timecode to be transmitted from the synchronization signal output apparatus 111 to the respective image capturing apparatus 110 on the line or channel 112 when the internal clock reaches the "start clock synchronization time" value. From this time, the synchronization signal generation unit 205 may increment the value of the time code according to the image standard;

a "start" parameter, indicating that a new value of the "start clock synchronization time" parameter and/or the "start clock synchronization time code" parameter is received;

a "free run" parameter, indicating that the synchronization signal generation unit 205 must no longer be synchronized with the internal clock 201a or 201b. Such mode may be useful in case of a network failure causing a synchronization loss with the time server 130a or 130b. Indeed, the second synchronization (i.e., the image capturing) starts to naturally drift with respect to the other image capturing apparatuses 110 of the system, but the large jitter caused by the synchronization loss and recovery will be avoided;

a "reference source" parameter, indicating the reference source for generating the synchronization signals, i.e., the internal clock 201a or 201b used for generating the synchronization signals.

Figure 3:
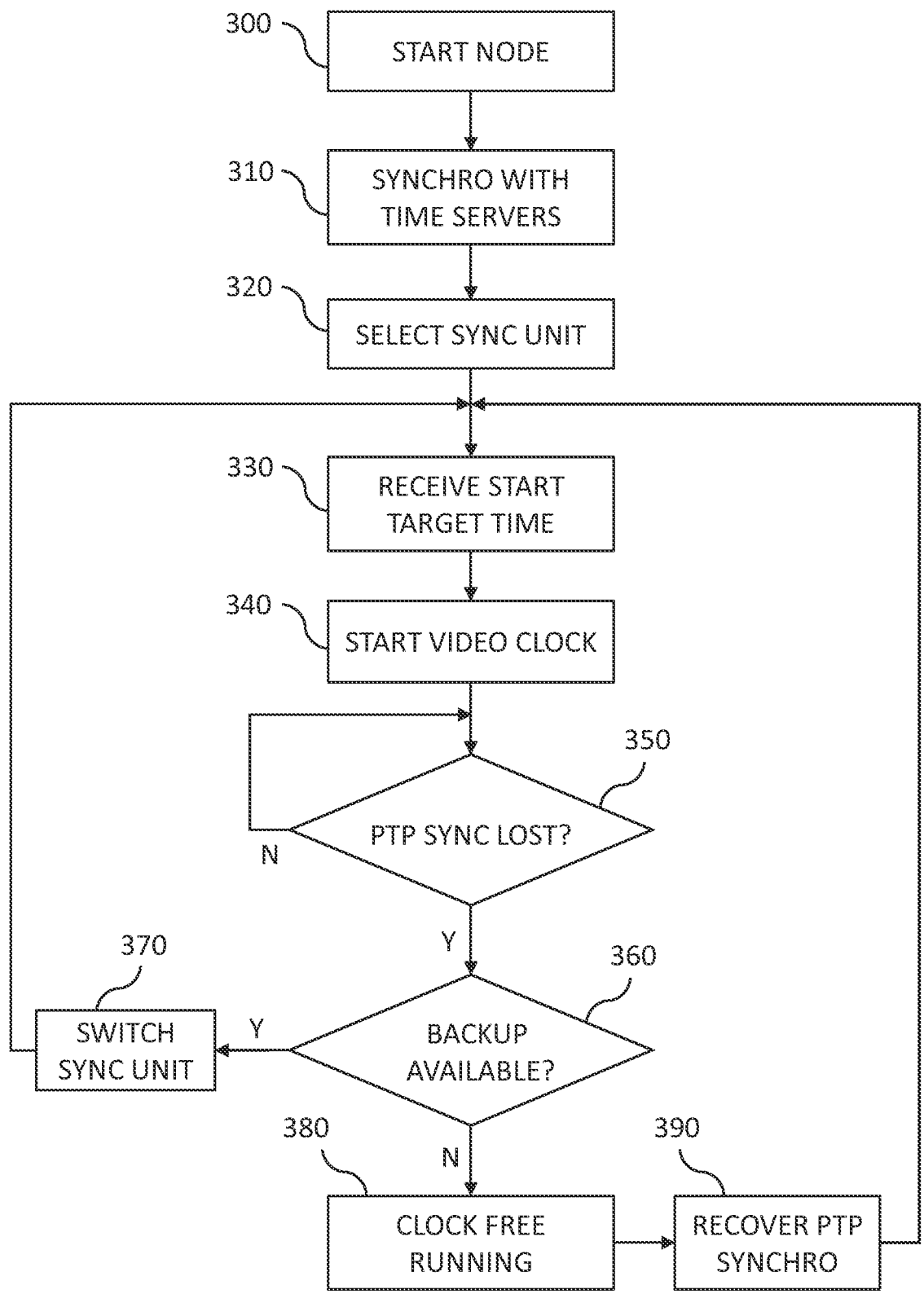
FIG. 3 is an example of a flow chart describing a method for generating synchronization signals according to one or several embodiments of the invention.

FIG. 3 is an example of a flow chart describing a method for generating synchronization signals from a synchronization signal output apparatus 111 to the respective image capturing apparatus 110 according to one or several embodiments of the invention.

Part of this flow chart can represent steps of an example of a computer program which may be executed by the synchronization controller 207.

These steps may be executed, for instance, after powering on, at a step 300, the synchronization signal output apparatus 111 (and its components 201-207) and the respective image capturing apparatus 110.

Then, at step 310, each of the two time synchronization units 203a and 203b synchronizes with a reference time held by a time server 130a, 130b. In one or several embodiments, the two time synchronization units 203a and 203b may synchronize with a same time server 130a, 130b. Alternatively, the two time synchronization units 203a and 203b may synchronize with two different time servers 130a and 130b. The time server 130a, 130b with which a time synchronization unit 203a, 203b synchronizes itself may be chosen according to a predefined parameter (e.g., a PREFERRED_SERVER parameter, as described below with reference to FIG. 5). Step 310 may end when at least one of the two time synchronization units 203a and 203b is synchronized with a time server 130a, 130b. If only one time synchronization unit 203a or 203b is synchronized with a time server 130a, 130b, the other time synchronization unit 203b or 203b may synchronize with a time server 130a, 130b later (e.g., during steps 330 or 340).

In one or several embodiments, the synchronization controller 207 may receive an indication that time synchronization unit(s) 203a, 203b is (are) synchronized, and step 310 ends when this indication is received.

By way of example and without limitation, the synchronization of a time synchronization unit 203a, 203b with a time server 130a, 130b may be performed according to the precision time protocol (PTP) defined in the IEEE 1588-2008 protocol, as set forth in the document entitled "IEEE Standard for a Precision Clock Synchronization Protocol for Networked Measurements and Control Systems" by IEEE Instrumentation and Measurements Society, Jul. 24, 2008. This protocol defines a number of states and possible events for the slave nodes (here, a slave node may correspond to a time synchronization unit 203a, 203b, and the master node may correspond to the time server 130a, 130b with which the time synchronization unit 203a, 203b is synchronized). In particular, the "SLAVE" state may indicate that the slave node has selected a remote entity as the master node and that its clock synchronized with the selected master node clock. In this case, the indication that the synchronization with the time server 130a, 130b has been achieved may be a message outputted by the time synchronization unit 203a, 203b when the standard defined state "SLAVE" is reached.

Of course, other synchronization protocols and other types of indications may be used. For instance, a network time protocol (NTP) may be used. Moreover, it may happen that the synchronization is considered to be achieved according to the protocol used (e.g., when the slave node enters a "SLAVE" state in PTP), but that this synchronization is not sufficiently accurate or stable. Such situation may especially occur in case of synchronization recovery after a network failure. In this case, complementary methods of the prior art (not described in the standard) can be used to determine when synchronization reaches a predetermined stability level.

At step 320, the synchronization controller 207 may select the time synchronization unit 203a, 203b to use for generating the synchronization signals (i.e., the reference source to be used among the primary internal clock 201a and the backup internal clock 201b). If only one time synchronization unit 203a, 203b is synchronized with a time server 130a or 130b, this time synchronization unit 203a, 203b is selected at step 320. If the two time synchronization units 203a and 203b are connected to a time server 130a, 130b, the controller may select the time synchronization unit 203a, 203b according to a predetermined rule. For instance, a system operator may preset that the primary time synchronization unit 203a is the one to use preferentially when the two time synchronization units 203a and 203b are synchronized with a time server 130a, 130b.

At step 330, the synchronization controller 207 may receive an indication relative to the value of a start target time, i.e., the time at which the capture of the image sequence has to be started by the image capturing apparatus 110. In the context of the invention, the reception of this indication may cover either a reception of this indication from the control apparatus 140, or a determination of this indication by the synchronization signal output apparatuses 111 itself (e.g., by the synchronization controller 207). For instance, the synchronization controller 207 may receive a START_TARGET_TIME message from the control apparatus 140 indicating the value of the start target time. As mentioned above, the START_TARGET_TIME message may also indicate the value of the time code associated with the first frame of the image sequence to capture. The time code value may be used for post-processing image sequences captured by a plurality of image capturing apparatuses 110, in particular for synchronizing images corresponding of a same time. The received values of the start target time and the start time code may be stored in a memory of the synchronization signal output apparatus 111.

The image capturing apparatus 110 may then start capturing the image sequence when the start target time is reached (step 340). In one or several embodiments, the step 340 may be performed as follows. First, the synchronization controller 207 may send a message to the selected synchronization signal generation unit 203a, 203b, wherein the value of the "start clock synchronization time" parameter is equal to the value of the start target time received at step 330, together with a "start" parameter. If, at step 330, the synchronization controller 207 also received a value of the start time code, the value of the "start clock synchronization time code" parameter may be set to this received value. The synchronization signal generation unit 205 may then send a synchronization signal to the image capturing apparatus 110 when the start target time is reached.

After starting capturing the image sequence (at step 340), a monitoring step 350 begins to detect a potential loss of synchronization between the time synchronization unit 203a or 203b selected at step 320 and the time server 130a or 130b. Such synchronization loss may occur in case of a network failure (for instance, due to network congestion, or link disconnection/reconnection) or a hardware failure (on the time server 130a, 130b or on the network interface).

For instance, in case of a PTP standard protocol, a synchronization loss may be detected when the synchronization signal output apparatus 111 leaves the "SLAVE" state. Other embodiments are possible. For instance, a network failure indication may be received from the data transmission/reception unit 202. This may be advantageous, because network failure indications are often available before synchronization loss notifications. Therefore, the system can be more reactive in case of network failure.

While no synchronization loss or network failure is detected (arrow "N" of step 350) synchronization signals continue to be sent to the image capturing apparatus 110 based on the internal clock 201a, 201b corresponding to the time synchronization unit 203a or 203b selected at step 320.

When a synchronization loss or a network failure is detected (arrow "Y" of step 350), the controller checks whether the other time synchronization unit 203a, 203b (i.e., the time synchronization unit 203a, 203b that was not selected at step 320) is synchronized with any of the two time servers 130a and 130b.

If the other time synchronization unit 203a, 203b is synchronized with any one of the time servers 130a and 130b (arrow "Y" of step 360), the synchronization controller 207 may select this other time synchronization unit 203a, 203b for generating the synchronization signals (step 370). Steps 330, 340, 350 and 360 may then be performed as described above, with the new time synchronization unit 203a, 203b.

If the other time synchronization unit 203a, 203b is not synchronized with any time server 130a, 130b (arrow "N" of step 360), the coupling of the synchronization signal generation unit 205 and the selected internal clock 201a or 201b may be stopped. In such mode (referred to as "free running mode", or "self-running mode"), the synchronization signal generation unit 205 does not update the internal signal based on the phase difference between the internal signal and a reference signal generated by the selected internal clock 201a or 201b.

The synchronization controller 207 may then wait for a time synchronization recovery of the synchronization signal output apparatus 111 (via any of the time synchronization units 203a and 203b) and a reference time held by any of the time servers 130a, 130b. This synchronization recovery is achieved at step 390. In one or several embodiments, an indication that the synchronization recovery is achieved may be received by the synchronization controller 207, similarly to step 310.

When the synchronization is recovered, the synchronization controller 207 may wait for the reception of a new start target time (the process goes back to step 330 with the time synchronization unit 203a, 203b that recovered synchronization first at step 390).

Figure 4:
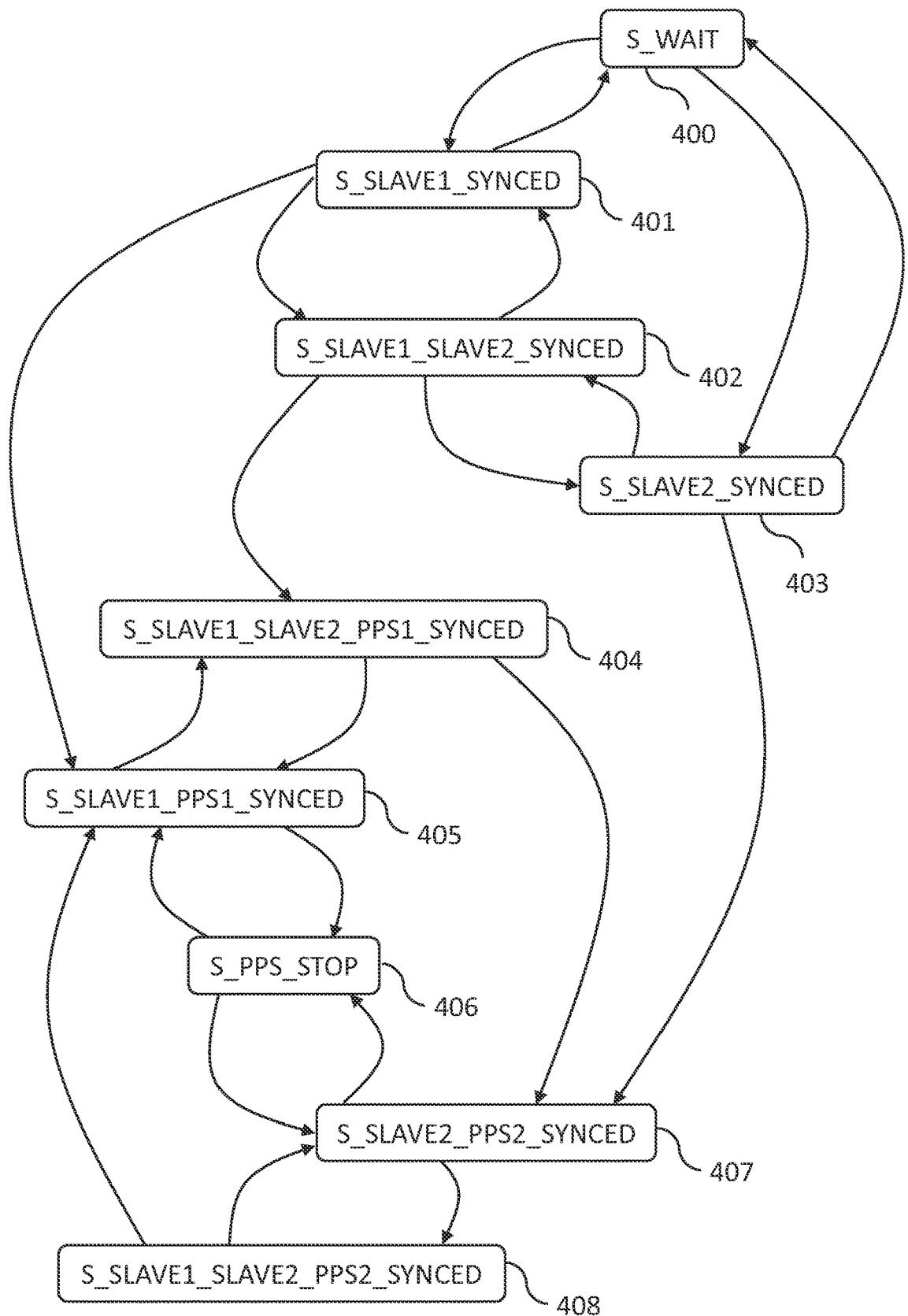
FIG. 4 illustrates an example of a state machine executed by the synchronization controller in one or several embodiments.

FIG. 4 illustrates an example of a state machine executed by the synchronization controller 207 in one or several embodiments.

This state machine aims to select the adequate internal clock 201a or 201b, i.e., the "reference source" to be provided to the synchronization signal generation unit 205. Synchronization signals to be sent to the respective image capturing apparatus 110 are therefore generated based on the selected internal clock. As detailed below, upon detection of a failure (loss of connection with the network 120 or with a time server 130a or 130b), the reference source (i.e., the internal clock 201a or 201b to be used for generating the synchronization signals) may be changed, so that the synchronization signal generation unit 205 continues to generate synchronization signals and provide them to the image capturing apparatus 110.

At the power up of the system, the synchronization controller 207 is in a state called "S_WAIT" 400. In this state 400, the synchronization controller 207 waits for one of the two time synchronization units 203a, 203b to synchronize to one available time server 130a or 130b.

If the synchronization controller 207 receives from the synchronization accuracy determination unit 206 an indication (e.g., an "EV_SLAVE1_SYNCED" message) that the primary time synchronization unit 203a is synchronized with a time server 130a or 130b, the state of the synchronization controller 207 may switch from the S_WAIT 400 to a new state 401 called "S_SLAVE1_SYNCED". This state 401 indicates that only the primary time synchronization unit 203a is synchronized with a time server 130a or 130b. It is recalled that the primary time synchronization unit 203a may be synchronized to either the primary time server 130a or the backup time server 130b (i.e., the primary time synchronization unit 203a is not necessarily synchronized with the primary time server 130a).

Similarly, if the synchronization controller 207, when it is in the S_WAIT state 400, receives from the synchronization accuracy determination unit 206 an indication (e.g., an "EV_SLAVE2_SYNCED" message) that the backup time synchronization unit 203b is synchronized with a time server 130a or 130b, the synchronization controller 207 may enter a new state 403 called "S_SLAVE2_SYNCED". This state 403 indicates that only the backup time synchronization unit 203b is synchronized with a time server 130a or 130b. It is recalled that the backup time synchronization unit 203b may be synchronized to either the primary time server 130a or the backup time server 130b (i.e., the backup time synchronization unit 203b is not necessarily synchronized with the backup time server 130b).

When the synchronization controller 207 is in the S_SLAVE1_SYNCED state 401, it may receive from the synchronization accuracy determination unit 206 an indication (e.g., an "EV_SYNC1_LOSS" message) indicating that the primary time synchronization unit 203a is no more synchronized with a time server 130a, 130b. Its state may then be changed to the S_WAIT state 400.

Similarly, when the synchronization controller 207 is in the S_SLAVE2_SYNCED state 403, it may receive from the synchronization accuracy determination unit 206 an indication (e.g., an "EV_SYNC2_LOSS" message) indicating that the backup time synchronization unit 203b is no more synchronized with a time server 130a, 130b. Its state may then be changed to the S_WAIT state 400.

When the synchronization controller 207 is in the S_SLAVE1_SYNCED state 401, it may receive from the synchronization accuracy determination unit 206 an indication (e.g., an "EV_SLAVE2_SYNCED") indication that the backup time synchronization unit 203b is also synchronized with a time server 130a or 130b. Its state may then switch to a new state 402 called for instance "S_SLAVE1_SLAVE2_SYNCED". It is noted that the primary time synchronization unit 203a and the backup time synchronization unit 203b may be synchronized with a same time server 130a or 130b, or with two different time servers 130a and 130b (for instance, the primary time synchronization unit 203a may be synchronized with the primary time server 130a and the backup time synchronization unit 203b may be synchronized with the backup time server 130b, or the primary time synchronization unit 203a may be synchronized with the backup time server 130b and the backup time synchronization unit 203b may be synchronized with the first time server 130a).

Similarly, when the synchronization controller 207 is in the S_SLAVE2_SYNCED state 403, it may receive from the synchronization accuracy determination unit 206 an indication (e.g., an "EV_SLAVE1_SYNCED") indication that the primary time synchronization unit 203a is also synchronized with a time server 130a or 130b. In this case, the state of the synchronization controller 207 switches to the S_SLAVE1_SLAVE2_SYNCED state 402. Once again, the primary time synchronization unit 203a and the backup time synchronization unit 203b may be synchronized with a same time server 130a or 130b, or with two different time servers 130a and 130b.

In the S_SLAVE1_SLAVE2_SYNCED state 402, the synchronization controller 207 may receive an indication from the synchronization accuracy determination unit 206, e.g., an "EV_SYNC1_LOSS" (resp. "EV_SYNC2_LOSS") message, that the primary time synchronization unit 203a (resp. the backup time synchronization unit 203b) lost the synchronization with its respective time server 130a or 130b. In this case, the state of the synchronization controller 207 is switched into the S_SLAVE2_SYNCED state 403 (resp. the S_SLAVE1_SYNCED state 401)

In the S_SLAVE1_SYNCED state 401, the S_SLAVE2_SYNCED state 403 or the S_SLAVE1_SLAVE2_SYNCED state 402, the synchronization controller 207 waits for a START_TARGET_TIME message reception. This message may be sent by the control apparatus 140.

When the synchronization controller 207 is in the S_SLAVE1_SYNCED state 401, the data transmission/reception unit 202 may receive a START_TARGET_TIME message and send an indication to the synchronization controller 207 (e.g., an "EV_START_FRAME_SYN" message) causing the latter to generate necessary signals and parameters to start the synchronization signal generation unit 205. For instance, the synchronization controller 207 may specify parameters to the synchronization signal generation unit 205 as follows:

the "start clock synchronization time" parameter is set to the value of the start target time received by the data transmission/reception unit 202, the "start clock synchronization timecode" parameter is set to the value of the start timecode received by the data transmission/reception unit 202, the "start" parameter is asserted, the "free run" parameter is de-asserted, and the "reference source" parameter is set to primary internal clock 201a.

The values of the start clock synchronization time and start clock synchronization timecode are then saved for further use, and the synchronization controller 207 switches from S_SLAVE1_SYNCED state 401 to a new state 405, called for instance "S_SLAVE1_PPS1_SYNCED". This state 405 indicates that only the primary time synchronization unit 203a is synchronized with a time server 130a or 130b and the generation of synchronization signals is performed based on the primary time synchronization unit 203a.

In the S_SLAVE1_PPS1_SYNCED state 405, the image capturing system (i.e., the synchronization signal output apparatus 111 and its respective image capturing apparatus 110) is synchronized with one time server 130a or 130b through one network connection. When the synchronization controller 207 is in this state 405, the image capture is functional but there is no robustness to a potential failure.

If the synchronization accuracy determination unit 206 sends an indication EV_SYNC1_LOSS meaning that the primary time synchronization unit 203a lost the synchronization with the time server 130a or 130b, then the synchronization controller 207 may set the synchronization signal generation unit 205 in a free-running mode. The "start" parameter is then de-asserted, the "free run" parameter is asserted, and the state of the synchronization controller 207 may be changed from the S_SLAVE1_PPS1_SYNCED state 405 to a new state called "S_PPS_STOP" 406 indicating that the synchronization signals are still generated, but this generation is no longer synchronized with a time server reference time.

Alternatively, if the synchronization accuracy determination unit 206 sends an EV_SLAVE2_SYNCED indication that the backup time synchronization unit 203b is synchronized, then the state changes from the S_SLAVE1_PPS1_SYNCED state 405 to a S_SLAVE1_SLAVE2_PPS1_SYNCED state 404. This state 404 indicates that both the primary time synchronization unit 203a and the backup time synchronization unit 203b are synchronized with a respective time server 130a, 130b and the generation of synchronization signals is performed based on the primary time synchronization unit 203a.

In the S_SLAVE1_SLAVE2_PPS1_SYNCED state 404, the image capturing system (i.e., the synchronization signal output apparatus 111 and its respective image capturing apparatus 110) is synchronized with one time server 130a or 130b through two network connections (through the primary and the backup time synchronization units 203a and 203b). When the synchronization controller 207 is in this state 405, the image capture is functional and robust to a potential network or time server failure.

If the synchronization accuracy determination unit 206 sends an indication, e.g., an EV_SYNC1_LOSS message, meaning that the primary time synchronization unit 203a lost synchronization with the time server 130a or 130b, the synchronization controller 207 must switch the reference clock of the synchronization signal generation unit 205 to the backup internal clock 201b. The "reference source" parameter is set to the backup internal clock 201b, and the state of the synchronization controller 207 then changes from the S_SLAVE1_SLAVE2_PPS1_SYNCED state 404 to a new state 407, called for instance S_SLAVE2_PPS2_SYNCED state 407. This state 407 indicates that only the backup time synchronization unit 203b is synchronized with a time server 130a or 130b and the generation of synchronization signals is performed based on the backup time synchronization unit 203b.

Alternatively, if the synchronization accuracy determination unit 206 sends an indication, e.g., an EV_SYNC2_LOSS message, meaning that the backup time synchronization unit 203b lost synchronization with the time server 130a or 130b, the state of the synchronization controller 207 changes from the S_SLAVE1_SLAVE2_PPS1_SYNCED state 404 to the S_SLAVE1_PPS1_SYNCED state 405. Synchronization parameters (in particular the "reference source" parameter) are unchanged.

When the synchronization controller 207 is in the S_SLAVE2_SYNCED state 403, the data transmission/reception unit 202 may receive a START_TARGET_TIME message and send an indication to the synchronization controller 207 (e.g., an "EV_START_FRAME_SYN" message) causing the latter to generate necessary signals and parameters to start the synchronization signal generation unit 205. For instance, the synchronization controller 207 may specify parameters to the synchronization signal generation unit 205 as follows:

the "start clock synchronization time" parameter is set to the value of the start target time received by the data transmission/reception unit 202, the "start clock synchronization timecode" parameter is set to the value of the start timecode received by the data transmission/reception unit 202, the "start" parameter is asserted, the "free run" parameter is de-asserted, and the "reference source" parameter is set to backup internal clock 201b.

The values of the start clock synchronization time and start clock synchronization timecode are then saved for further use, and the synchronization controller 207 switches from S_SLAVE2_SYNCED state 401 to the S_SLAVE2_PPS2_SYNCED state 407.

In the S_SLAVE2_PPS2_SYNCED state 407, the image capturing system (i.e., the synchronization signal output apparatus 111 and its respective image capturing apparatus 110) is synchronized with one time server 130a or 130b through one network connection. When the synchronization controller 207 is in this state 407, the image capture is functional but there is no robustness to a potential failure.

If the synchronization accuracy determination unit 206 sends an indication EV_SYNC2_LOSS meaning that the backup time synchronization unit 203b lost the synchronization with the time server 130a or 130b, then the synchronization controller 207 may set the synchronization signal generation unit 205 in a free-running mode. The "start" parameter is then de-asserted, the "free run" parameter is asserted, and the state of the synchronization controller 207 may be changed from the S_SLAVE2_PPS2_SYNCED state 407 to the S_PPS_STOP state 406.

Alternatively, if the synchronization accuracy determination unit 206 sends an EV_SLAVE1_SYNCED indication that the primary time synchronization unit 203a is synchronized, then the state changes from the S_SLAVE2_PPS2_SYNCED state 407 to a S_SLAVE1_SLAVE2_PPS2_SYNCED state 408. This state 408 indicates that both the primary time synchronization unit 203a and the backup time synchronization unit 203b are synchronized with a respective time server 130a, 130b (which may be the same time server or two different time servers) and the generation of synchronization signals is performed based on the backup time synchronization unit 203b.

In the S_SLAVE1_SLAVE2_PPS2_SYNCED state 408, the image capture system is synchronized to at least one time server 130a and/or 130b through two network connections (via the primary and the backup time synchronization units 203a and 203b). When the synchronization controller 207 is in this state 408, the image capture is functional and robust to a network or time server failure.

If the synchronization accuracy determination unit 206 sends an indication, e.g., an EV_SYNC1_LOSS message, indicating that the primary time synchronization unit 203a lost synchronization with the time server 130a or 130b, then the state of the synchronization controller changes from S_SLAVE1_SLAVE2_PPS2_SYNCED state 408 to S_SLAVE2_PPS2_SYNCED state 407.

Alternatively, if the synchronization accuracy determination unit 206 sends an indication, e.g., an EV_SYNC2_LOSS message, indicating that the backup time synchronization unit 203b lost synchronization with the time server 130a or 130b, the synchronization controller 207 must switch the reference clock of the synchronization signal generation unit to the primary internal clock 201a, i.e., the "reference source" parameter is set to the primary internal clock 201a. Then the state changes to S_SLAVE1_PPS1_SYNCED state 405.

When the synchronization controller 207 is in the S_SLAVE1_SLAVE2_SYNCED state 402, the data transmission/reception unit 202 may receive a START_TARGET_TIME message and send an indication to the synchronization controller 207 (e.g., an "EV_START_FRAME_SYN" message) causing the latter to generate necessary signals and parameters to start the synchronization signal generation unit 205. For instance, the synchronization controller 207 may specify parameters to the synchronization signal generation unit 205 as follows:

the "start clock synchronization time" parameter is set to the value of the start target time received by the data transmission/reception unit 202, the "start clock synchronization timecode" parameter is set to the value of the start timecode received by the data transmission/reception unit 202, the "start" parameter is asserted, the "free run" parameter is de-asserted, and the "reference source" parameter is set to primary internal clock 201a.

In this case, it has been predetermined that, when the two time synchronization units 203a and 203b are synchronized with a respective time server 130a, 130b, the primary time synchronization unit 203a is considered by default to synchronize the corresponding primary internal clock 201a with the time server 130a, 130b, said primary internal clock 201a being used as reference source for generating the synchronization signals.

The values of the start clock synchronization time and start clock synchronization timecode are then saved for further use, and the synchronization controller 207 switches from S_SLAVE1_SLAVE2_SYNCED state 402 to the S_SLAVE1_SLAVE2_PPS1_SYNCED state 404.

In the S_PPS_STOP state 406, the synchronization controller 207 may wait for a synchronization recovery by any of the two time synchronization units 203a and 203b. Until such recovery happens, the synchronization signal generation unit 205 may be in a free-running mode.

If the synchronization accuracy determination unit 206 sends an indication, e.g., an EV_SLAVE1_SYNCED message, indicating that the first time synchronization unit 203a is synchronized with a time server 130a or 130b, then the synchronization controller 207 must realign the synchronization signal generation unit 205 by computing a new target time and a new timecode. This can be performed by any method of the prior art. Then, the synchronization parameters are set as follows:

the "start clock synchronization time" parameter is set to the new value of the start target time computed, the "start clock synchronization timecode" parameter is set to the new value of the timecode received, the "start" parameter is asserted, the "free run" parameter is de-asserted, and the "reference source" parameter is set to primary internal clock 201a.

The state of the synchronization controller 207 may then be changed from S_PPS_STOP state 406 to the S_SLAVE1_PPS1_SYNCED state 405.

Alternatively, if the synchronization accuracy determination unit 206 sends an indication, e.g., an EV_SLAVE2_SYNCED message, indicating that the backup time synchronization unit 203b is synchronized with a time server 130a or 130b, then the synchronization controller 207 must realign the synchronization signal generation unit 205 by computing a new target time and a new timecode. This can be performed by any method of the prior art. Then, the synchronization parameters are set as follows:
- the "start clock synchronization time" parameter is set to the new value of the start target time computed,
- the "start clock synchronization timecode" parameter is set to the new value of the timecode received,
- the "start" parameter is asserted,
- the "free run" parameter is de-asserted, and
- the "reference source" parameter is set to backup internal clock 201b.

The state of the synchronization controller 207 may then be changed from S_PPS_STOP state 406 to the S_SLAVE2_PPS2_SYNCED state 407.

It is noted that the EV_SYNC1_LOSS indication may also be sent by the data transmission/reception unit 202 when a network failure is detected on the primary interface. Similarly, the EV_SYNC2_LOSS indication may also be sent by the data transmission/reception unit 202 when a network failure is detected on the backup interface.

It is further noted that the synchronization controller 207 may generate the EV_SLAVE1_SYNCED (respectively EV_SLAVE2_SYNCED) indications when the standard defined state "SLAVE" is reached by the primary time synchronization unit 203a (respectively the backup time synchronization unit 203b). For instance, the PTP standard defines a protocol state machine, which defines the state and action of a PTP entity in function of the exchanged messages and various events. Among them, the "SLAVE" state indicates that an entity has selected a remote entity as the time master and that all necessary initializations have been performed to allow the slave entity to synchronize its clock with the remote master entity's clock.

Finally, it is noted that if the time servers 130a and 130b are not synchronized with the same time source (for example GPS time), then the time difference between the two time servers 130a and 130b must be taken into account in the calculation of the new target time and the new timecode. For example, if the time difference between the two time servers 130a and 130b is noted $\Delta_s$ and if the time server used as reference has changed, then $\Delta_s$ must be added to the new target time.

Figure 5:
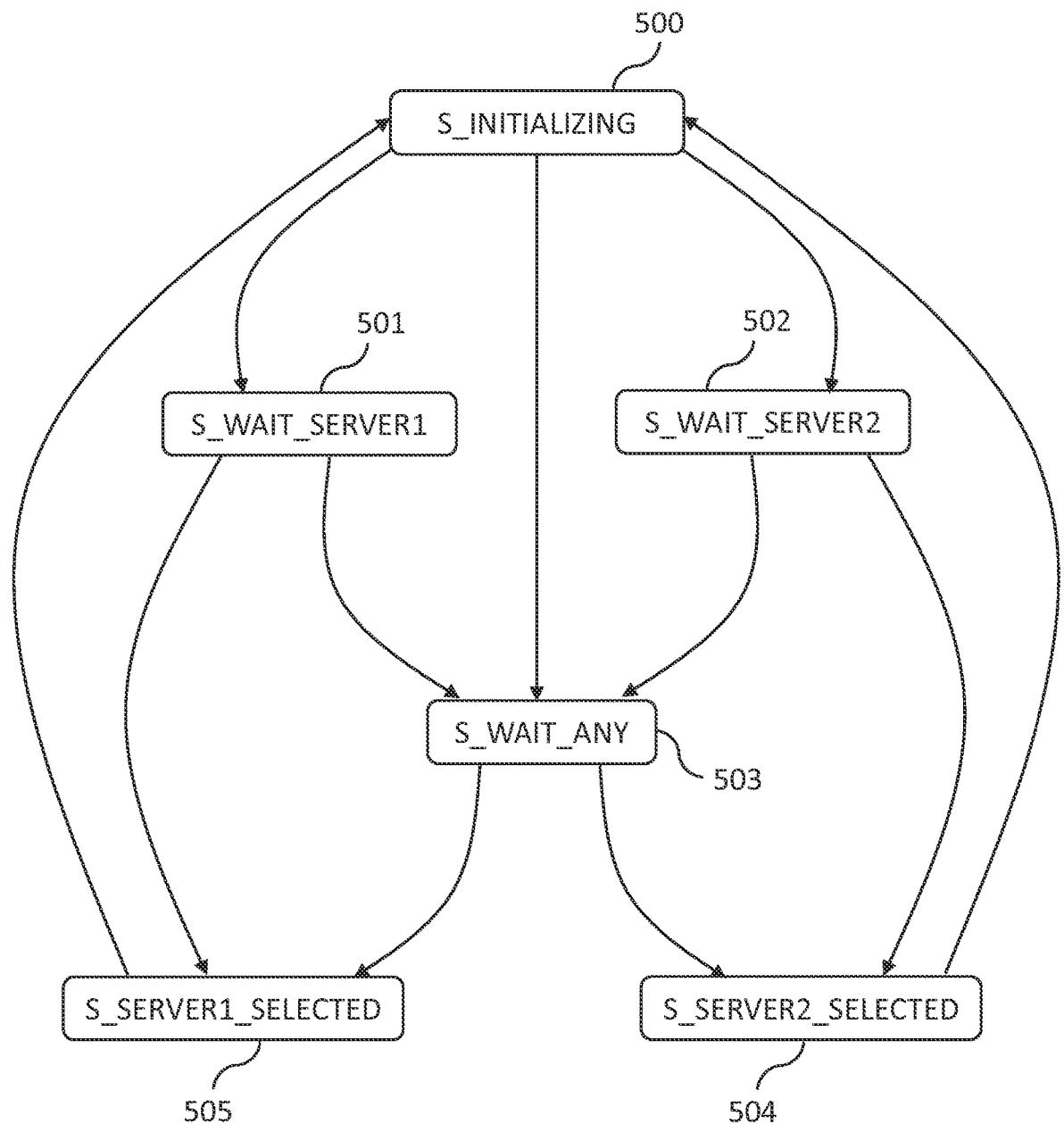
FIG. 5 illustrates an example of a state machine executed by the time synchronization units in one or several embodiments.

FIG. 5 illustrates an example of a state machine executed by the time synchronization units 203a, 203b in one or several embodiments. The purpose of the state machine is the selection of the appropriate time server 130a, 130b if more than one time server 130a, 130b is available.

Each time synchronization unit 203a, 203b may be associated with a configuration parameter named "PREFERRED_SERVER". This configuration parameter may be used to preferentially assign one of the time servers 130a and 130b to the respective time synchronization unit 203a, 203b. For instance, the PREFERRED_SERVER may have three possible values:
- EV_SERVER1_FIRST: if available, primary time server 130a must be used,
- EV_SERVER2_FIRST: if available, backup time server 130b must be used, and
- EV_ANY_SERVER: the first available time server 130a or 130b must be used.

A system operator may, for instance, predefine the values of the PREFERRED_SERVER parameters to be used when the capture system is powered on.

In first embodiments, the two time synchronization units 203a, 203b may be assigned to two different time servers 130a, 130b. For instance, the configuration parameter PREFERRED_SERVER may be set to the primary time server 130a (EV_SERVER1_FIRST) for the primary time synchronization unit 203a and the configuration parameter PREFERRED_SERVER may be set to the backup time server 130b (EV_SERVER2_FIRST) for the backup time synchronization unit 203b. As illustrated in FIGS. 6a, 6b and 6c described below, such configuration is robust to two successive failures.

In second embodiments, the two time synchronization units 203a and 203b may be assigned to a same time server 130a or 130b. For instance, the configuration parameter PREFERRED_SERVER may be set to the primary time server 130a (EV_SERVER1_FIRST) for the two time synchronization units 203a and 203b. This configuration may advantageously be used when the primary time server 130a is of higher quality than the backup time server 130b. Here, "quality" of a time server is defined both in terms of accuracy and in terms of robustness.

In third embodiments, the configuration parameter PREFERRED_SERVER is set to the any available time server (EV_ANY_SERVER) for the two time synchronization units 203a and 203b. This configuration must advantageously be used when time servers 130a and 130b cannot be identified at the time of the system configuration. Such situation may occur, for example, if the time servers are installed or changed after the system configuration.

In fourth embodiments, the standard IEEE 1588-2008 time server selection algorithm (BMCA) may be used instead of the state machine described below. This embodiment is actually not optimal as it may be difficult to implement the example case of the FIGS. 6a, 6b and 6c.

Referring to FIG. 5, when the system is powered on, each of the two time synchronization units 203a and 203b is in the S_INITIALIZING state 500. In this S_INITIALIZING state 500, the time synchronization unit 203a (or 203b) may read the PREFERRED_SERVER configuration parameter.

If the configuration parameter value is EV_SERVER1_FIRST, then the state is changed to S_WAIT_SERVER1 501. If the configuration parameter value is EV_SERVER2_FIRST, then the state is changed to S_WAIT_SERVER2 502. If the configuration parameter value is EV_ANY_SERVER, then the state is changed to S_WAIT_ANY 503.

In the S_WAIT_SERVER1 state 501, the time synchronization unit 203a (or 203b) waits for the reception of messages from the primary time server 130a.

If the data transmission/reception unit 202 receives messages from the primary time server 130a on its primary interface (respectively on its backup interface), then it sends an EV_SERVER1_AVAILABLE message to the primary time synchronization unit 203a (respectively the backup time synchronization unit 203b). The state of the primary time synchronization unit 203a (respectively the backup time synchronization unit 203b) then changes from the S_WAIT_SERVER1 state 501 to a S_SERVER1_SELECTED state 505.

If no EV_SERVER1_AVAILABLE message is received by the primary time synchronization unit 203a (respectively the backup time synchronization unit 203b) after a predetermined amount of time, the state of this time synchronization unit 203a (respectively 203b) changes from the S_WAIT_SERVER1 state 501 to the S_WAIT_ANY state 503. The predetermined amount of time may be, in embodiments, a value between 3 seconds and 6 seconds.

In the S_WAIT_SERVER2 state 502, the time synchronization unit 203a (or 203b) waits for the reception of messages from the backup time server 130b.

If the data transmission/reception unit 202 receives messages from the backup time server 130b on its primary interface (respectively on its backup interface), then it sends an EV_SERVER2_AVAILABLE message to the primary time synchronization unit 203a (respectively the backup time synchronization unit 203b). The state of the primary time synchronization unit 203a (respectively the backup time synchronization unit 203b) then changes from the S_WAIT_SERVER2 state 502 to a S_SERVER2_SELECTED state 504.

If no EV_SERVER2_AVAILABLE message is received by the primary time synchronization unit 203a (respectively the backup time synchronization unit 203b) after a predetermined amount of time, the state of this time synchronization unit 203a (respectively 203b) changes from the S_WAIT_SERVER2 state 502 to the S_WAIT_ANY state 503. The predetermined amount of time may be, in embodiments, a value between 3 seconds and 6 seconds.

In the S_WAIT_ANY state 503, the time synchronization unit 203a (respectively 203b) waits for the reception of messages from any of the time servers 130a and 130b.

If the data transmission/reception unit 202 receives messages from the primary time server 130a on its primary interface (respectively from its backup interface) then it sends an EV_SERVER1_AVAILABLE message to the primary time synchronization unit 203a (respectively the backup time synchronization unit 203b). The state of the primary time synchronization unit 203a (respectively the backup time synchronization unit 203b) then changes from the S_WAIT_ANY state 503 to the S_SERVER1_SELECTED state 505.

If the data transmission/reception unit 202 receives messages from the backup time server 130b on its primary interface (respectively from its backup interface) then it sends an EV_SERVER2_AVAILABLE message to the primary time synchronization unit 203a (respectively the backup time synchronization unit 203b). The state of the primary time synchronization unit 203a (respectively the backup time synchronization unit 203b) then changes from the S_WAIT_ANY state 503 to the S_SERVER2_SELECTED state 504.

In the S_SERVER1_SELECTED state 505, the primary time synchronization unit 203a (respectively the backup time synchronization unit 203b) synchronizes with the primary time server 130a. When the time synchronization is achieved, the synchronization accuracy determination unit 206 may send an EV_SLAVE1_SYNC (respectively EV_SLAVE2_SYNC) message to the synchronization controller 207.

If the synchronization accuracy determination unit 206 sends an indication EV_SYNC1_LOSS (respectively EV_SYNC2_LOSS) indicating that the primary time synchronization unit 203a (respectively the backup time synchronization unit 203b) lost synchronization with the primary time server 130a, then its state switches from the S_SERVER1_SELECTED state 505 to the S_INITIALIZING state 500.

In the S_SERVER2_SELECTED state 504, the primary time synchronization unit 203a (respectively the backup time synchronization unit 203b) synchronizes with the backup time server 130b. When the time synchronization is achieved, the synchronization accuracy determination unit 206 may send an EV_SLAVE1_SYNC (respectively EV_SLAVE2_SYNC) message to the synchronization controller 207.

If the synchronization accuracy determination unit 206 sends an indication EV_SYNC1_LOSS (respectively EV_SYNC2_LOSS) indicating that the primary time synchronization unit 203a (respectively the backup time synchronization unit 203b) lost synchronization with the backup time server 130b, then its state switches from the S_SERVER2_SELECTED state 504 to the S_INITIALIZING state 500.

In some situations, it may be useful to force a time synchronization unit 203a, 203b to synchronize with a particular timer server 130a, 130b. This makes it possible to recover, in certain situations, a configuration where each time synchronization unit 203a, 203b is synchronized with a respective different time server 130a, 130b. This is the case, for example, in the example of FIG. 7c, as detailed below with reference to this figure. For this, several implementations are possible. In a first implementation, the value of the PREFERRED_SERVER parameter may be dynamically changed. The modification of the value of the PREFERRED_SERVER parameter may be performed upon reception of an EV_SYNC1_LOSS (or EV_SYNC2_LOSS) message. For instance, suppose that the primary time synchronization unit 203a has a PREFERRED_SERVER set to EV_SERVER1_FIRST and losses synchronization with the primary time server 130a (i.e., an EV_SYNC1_LOSS message is sent), while the backup time synchronization unit 203b is synchronized with the primary time server 130a. The primary time synchronization unit 203a switches in the S_INITIALIZING state 500. At this point, the PREFERRED_SERVER parameter of the primary time synchronization unit 203a may be set to EV_SERVER2_FIRST. Therefore, if the backup time server 130b is reachable, the primary time synchronization unit 203a then synchronizes with the backup time server 130b, even if, in the meantime, the primary time server 130a has become reachable again. The two time synchronization units 203a and 203b are thus synchronized with two different time servers 130a and 130b.

In a second implementation, a test may be performed when a time synchronization unit 203a, 203b enters the S_WAIT_ANY state 503. For example, if the primary time synchronization unit 203a enters the S_WAIT_ANY state 503, the synchronization accuracy determination unit 206 may send an indication that the backup time synchronization unit 203b is already synchronized with the primary time server 130a. Then, the primary time synchronization unit 203a may try to preferentially synchronize with the backup time server 130b if the latter is reachable, even if the PREFERRED_SERVER parameter of the primary time synchronization unit 203a is set to EV_SERVER1_FIRST.

Of course, other implementations are possible to force a time synchronization unit 203a, 203b to synchronize with a specific time server 130a, 130b.

It is noted that an EV_SYNC1_LOSS indication may also be sent by the data transmission/reception unit 202 when a network failure is detected on the primary interface. Similarly, an EV_SYNC2_LOSS indication may also be sent by the data transmission/reception unit 202 when a network failure is detected on the backup interface.

Furthermore, the selection of a time server 130a, 130b may be achieved by configuring the PTP domain number (which is a configuration parameter defined in the IEEE1588 standard). To do so, a different domain number may be assigned to each of the time servers 130a and 130b. Then, selecting a time server 130a, 130b by a time synchronization unit 203a, 203b may require setting the PTP domain number of the unit to match the PTP domain number of the time server 130a, 130b.

FIGS. 6a, 6b and 6c illustrate an example of generation of synchronization signals by a synchronization signal output apparatus in case of successive network failures, in one or several embodiments of the invention. In these figures, and in FIGS. 7a, 7b and 7c, it is assumed that the PREFERRED_SERVER parameter is set to "EV_SERVER1_FIRST" for the primary time synchronization unit 203a and to "EV_SERVER2_FIRST" for the backup time synchronization unit 203b.

In these figures, the system is simplified for the sake of clarity (the complete system has been described with reference to FIGS. 1a and 2). FIGS. 6a, 6b and 6c represent the primary time server 130a, the backup time server 130b, and the network 120 to which each time server 130a, 130b is connected. Only certain components of the synchronization signal output apparatus 111 are shown, namely the primary time synchronization unit 203a and the backup time synchronization unit 203b. The primary time synchronization unit 203a is connected to the network 120 through a primary interface and the backup time synchronization unit 203b is connected to the network 120 through a backup interface. The synchronization controller 207 is connected to the two time synchronization units 203a, 203b by a respective reference signal. The synchronization controller 207 selects one of the two reference signals to synchronize the image capturing apparatus 110 (the reference signal is derived from one of the two internal clocks 201a or 201b not shown in FIGS. 6a, 6b and 6c).

FIG. 6a illustrates a "normal" case, where the two time servers 130a and 130b and the two time synchronization units 203a and 203b are functional, and where a connection is established between the time synchronization units 203a and 203b and the time servers 130a, 130b via the network 120.

The primary time server 130a sends synchronization messages, here called "ts1" to distinguish them from other messages, that are received both by the primary time synchronization unit 203a through the primary interface and by the backup time synchronization unit 203b through the backup interface. Similarly, the backup time server 130b sends synchronization messages "ts2" that are received both by the primary time synchronization unit 203a through the primary interface and by the backup time synchronization unit 203b through the backup interface.

It may be preconfigured that, when the two time servers 130a, 130b are available, the primary time synchronization unit 203a synchronizes itself with the primary time server 130a and the backup time synchronization unit 203b synchronizes itself with the backup time server 130a. Thus, in case of FIG. 6a, the primary time synchronization unit 203a is synchronized with the primary time server 130a and the backup time synchronization unit 203b is synchronized with the backup time server 130b.

As mentioned above in reference with FIG. 4, it may also be preconfigured that, when the two time synchronization units 203a, 203b are functional and synchronized with a time server 130a or 130b, the synchronization controller 207 selects the primary time synchronization unit 203a to generate synchronization signals to the image capturing apparatus 110. Therefore, in case of FIG. 6a, the synchronization controller 207 selects the primary internal clock 201a (not shown in the Figure) as time reference to generate synchronization signals.

In the configuration of FIG. 6a, the synchronization controller 207 is in the S_SLAVE1_SLAVE2_PPS1_SYNCED state 404, the primary time synchronization unit 203a is in the S_SERVER1_SELECTED state 505 and the backup time synchronization unit 203b is in the S_SERVER2_SELECTED state 504.

FIG. 6b illustrates what may happen next if the primary time server 130a fails (i.e., is no more connected to the network 120). Upon such failure, the primary time synchronization unit 203a is no longer synchronized with a time server. Therefore, the synchronization controller 207 may switch the time reference from the primary time synchronization unit 203a to the backup time synchronization unit 203b. This allows an almost instantaneous change of the synchronization reference, thus allowing the image capturing apparatus 110 to capture images despite the time server failure.

Then, the primary time synchronization unit 203a may synchronize itself with the backup time server 130b. It is noted that the re-synchronization of the primary time synchronization unit 203a with a different time server may take several seconds.

In terms of states, the synchronization controller 207 first switches from the S_SLAVE1_SLAVE2_PPS1_SYNCED state 404 to the S_SLAVE2_PPS2_SYNCED state 407. Then, after few seconds (time for re-synchronizing the primary time synchronization unit 203a with the backup time server 130b), the synchronization controller 207 switches again to the S_SLAVE1_SLAVE2_PPS2_SYNCED state 408.

The primary time synchronization unit 203a first switches from the S_SERVER1_SELECTED state 505 to the S_INITIALIZING_STATE 500, then to the S_WAIT_SERVER1 state 501, then to the S_WAIT_ANY state 503, and finally to the S_SERVER2_SELECTED state 504. The backup time synchronization unit 203b stays the S_SERVER2_SELECTED state 504.

FIG. 6c illustrates what may happen next if backup interface of the synchronization signal output apparatus 111 is disconnected.

The synchronization controller 207 switches the time reference from the backup time synchronization unit 203b to the primary time synchronization unit 203a (since the backup time synchronization unit 203b is no longer connected to any time server 130a, 130b). This allows an almost instantaneous change of the synchronization reference, thus allowing the image capturing apparatus 110 to capture images despite the time server failure.

That means that the synchronization controller 207 switches from the S_SLAVE1_SLAVE2_PPS2_SYNCED state 408 to the S_SLAVE1_PPS1_SYNCED state 405. The primary time synchronization unit 203a stays in the S_SERVER2_SELECTED state 504. The backup time synchronization unit 203b first switches from the S_SERVER2_SELECTED state 504 to the S_INITIALIZING state 500, then to the S_WAIT_SERVER2 state 501, and finally to the S_WAIT_ANY state 503.

Figure 7A:
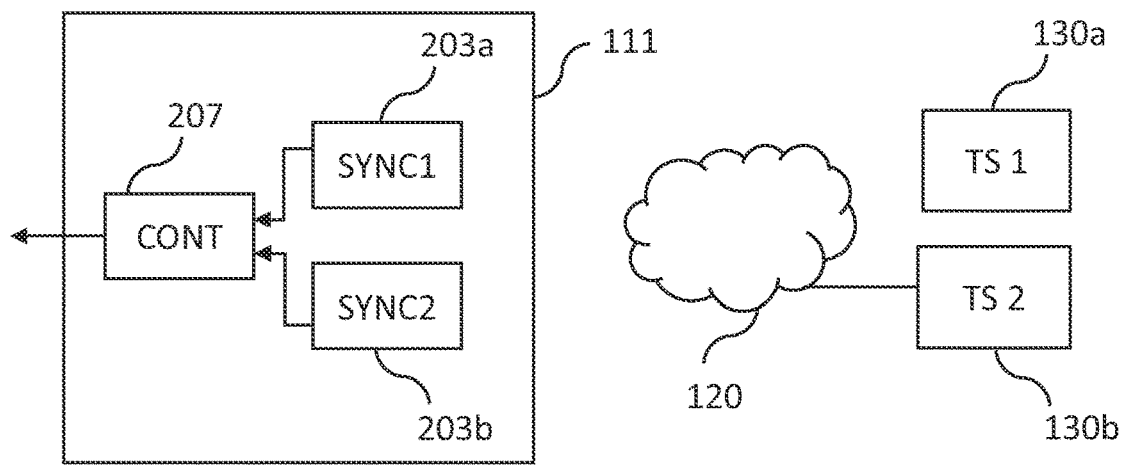
FIGS. 7a, 7b and 7c illustrate examples of generation of synchronization signals by a synchronization signal output apparatus in case of network failures and/or synchronization recoveries, in one or several embodiments.
Figure 7B:
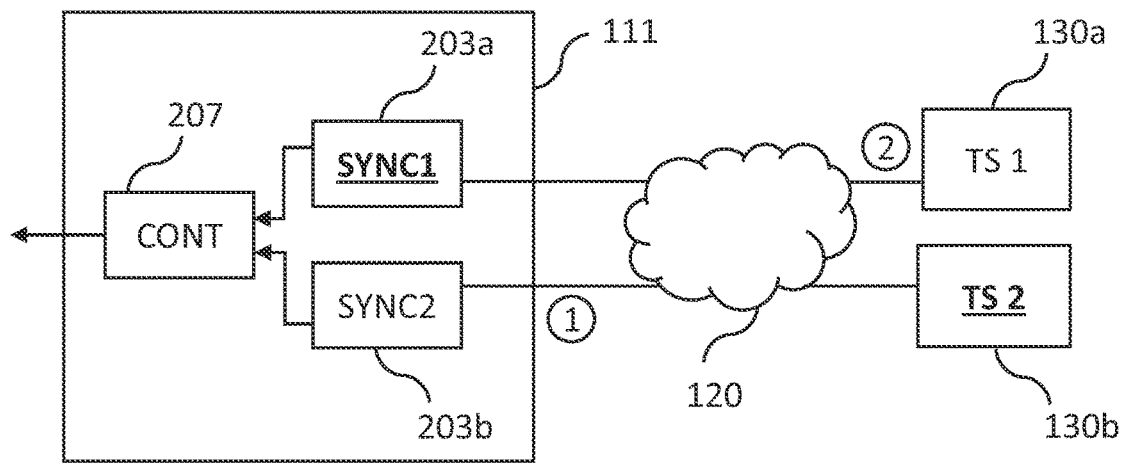
Figure 7C:
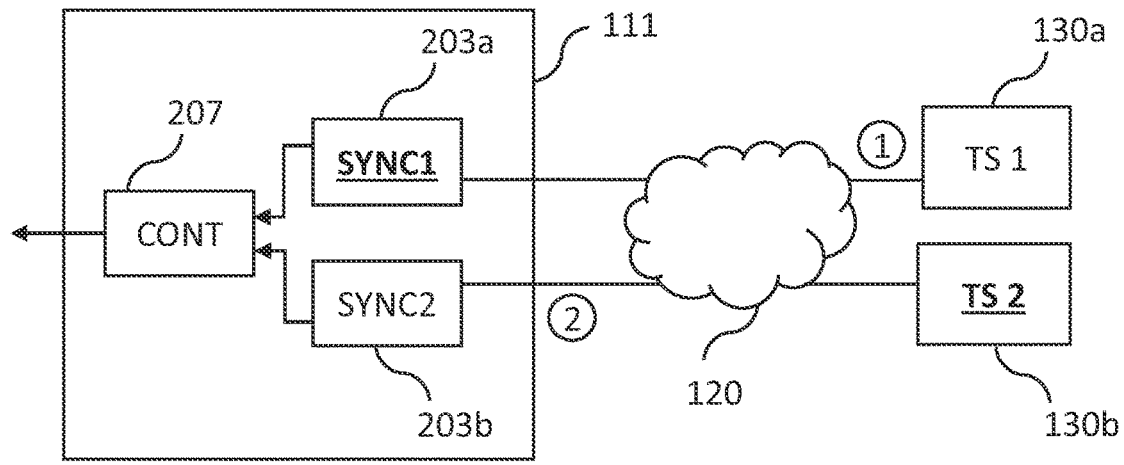

FIGS. 7a, 7b and 7c illustrate examples of generation of synchronization signals by a synchronization signal output apparatus in case of network failures and/or synchronization recoveries, in one or several embodiments of the invention. More specifically, FIGS. 7a, 7b and 7c correspond respectively to three different possible scenarios after the configuration of FIG. 6c. Each of FIGS. 7a, 7b and 7c has to be seen as illustrating a possible configuration of the system after the configuration of FIG. 6c, and not as successive configurations.

In FIG. 7a, it is assumed that the backup time synchronization unit 203b also lost synchronization with the backup time server 130b because of a further failure (e.g. a hardware failure on the backup time synchronization unit 203b or on the backup time server 130b, or a network failure on the communication link between the backup time synchronization unit 203b and the backup time server 130b).

In this case, no more time synchronization unit 203a, 203b is synchronized with any of the time servers 130a, 130b. The free running mode is therefore activated to ensure continuity of image capture. The system operates in degraded mode, because of the drift of the internal clock of the synchronization signal output apparatus 111 with respect to other synchronization signal output apparatuses 111 of the system.

The synchronization controller switches from the S_SLAVE1_PPS1_SYNCED state 405 to the S_PPS_STOP state 406. The backup time synchronization unit 203b stays in the S_WAIT_ANY state 503. The primary time synchronization unit 203a first switches from the S_SERVER2_SELECTED state 504 to the S_INITIALIZING state 500, then to the S_WAIT_SERVER1 state 501, and finally to the S_WAIT_ANY state 503.

In FIG. 7b, it is assumed that, after the configuration of FIG. 6c, the communication link between the backup time synchronization unit 203b and the network 120 is re-established, and then the communication link between the primary time server 130a and the network 120 is re-established (in that order).

When the communication link between the backup time synchronization unit 203b and the network 120 is re-established, the backup time synchronization unit 203b may detect that the backup time server 130b is available and synchronizes with it. Therefore, the two time synchronization units 203a and 203b are synchronized with the same time server 130b. The generation of synchronization signals is based on the primary time synchronization unit 203a (i.e., the synchronization controller 207 selects the primary internal clock 201a as time reference to generate synchronization signals), as in FIG. 6c.

In some embodiments, when the communication link between the primary time server 130a is re-established, the two time synchronization units 203a and 203b stay synchronized with the backup time server 130b. This configuration is robust in case of a communication loss between the primary time synchronization unit 203a and the backup time server 130b. However, such configuration is not robust in the event of a failure on the backup time server 130b.

Therefore, in alternative embodiments, if the two time synchronization units 203a and 203b are synchronized with a same time server 130a or 130b (i.e., the two time synchronization units 203a and 203b are both in the same state 504 or 505), both time servers 130a and 130b being functional and connected to the network 120, the time synchronization unit 203a, 203b which is not used for generating the synchronization signals may be instructed (e.g., by the synchronization controller 207) to interrupt its synchronization with the current time server 130a or 130b, and to synchronize with the other time server 130b or 130a. For instance, the synchronization controller 207 may communicate with the time synchronization units 203a and 203b to know their respective states, and instruct a change when two following conditions are met:
- the synchronization controller 207 is either in the S_SLAVE1_SLAVE2_PPS1_SYNCED state 404 or in the S_SLAVE1_SLAVE2_PPS2_SYNCED state 408; and
- the two time synchronization units 203a and 203b both are in the S_SERVER2_SELECTED state 504 or in the S_SERVER1_SELECTED state 505.

In the context of FIG. 7b, that means that, the synchronization between the backup time synchronization unit 203b and the backup time server 130b is interrupted, and the backup time synchronization unit 203b is synchronized with the primary time server 130a. Therefore, the system regains a configuration as in FIG. 6a, where it can resist to several successive failures.

In FIG. 7c, after the configuration of FIG. 6c, it is assumed that the communication link between the primary time server 130a and the network 120 is re-established, and then the communication link between the backup time synchronization unit 203b and the network 120 is re-established (in that order).

When the communication between the backup time synchronization unit 203b and the network 120 is re-established, the backup time synchronization unit 203b may detect that both the primary time server 130a and the backup time server 130b are available. Since the backup time synchronization unit 203b is in the S_WAIT_ANY state 503, it synchronizes with the first time server 130a, 130b from which it receives messages. Potentially, this can be the backup time server 130b, whereas the primary time synchronization unit 203a is already synchronized with it. The two time synchronization units 203a and 203b are thus synchronized with the same time server 130b. This configuration is robust to a failure on one of the interfaces or on a communication link between a time synchronization unit 203a, 203b and the network 120, but not to a failure on the backup time server 130b.

In one or several embodiments, it is therefore possible to force the backup time synchronization unit 203b to synchronize with the primary time server 130a, as explained above in reference with FIG. 5 (e.g., by modifying the PREFERRED_SERVER parameter, or by performing a test). The two time synchronization units 203a and 203b are thus synchronized with two different time servers 130a, 130b, making the configuration more robust to successive failures. Alternatively, the change of time server may be performed as detailed above in reference with FIG. 7b.

In all cases, the generation of synchronization signals remains based on the primary time synchronization unit 203a (i.e., the synchronization controller 207 selects the primary internal clock 201a as time reference to generate synchronization signals), as in FIG. 6c, until a new failure occurs.

Embodiment(s) of the present invention can also be realized by a computer of a system or apparatus that reads out and executes computer executable instructions (e.g., one or more programs) recorded on a storage medium (which may also be referred to more fully as a "non-transitory computer-readable storage medium") to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), etc.), a flash memory device, a memory card, and the like.

Expressions such as "comprise", "include", "incorporate", "contain", "is" and "have" are to be construed in a non-exclusive manner when interpreting the description and its associated claims, namely construed to allow for other items or components which are not explicitly defined also to be present. Reference to the singular is also to be construed in be a reference to the plural and vice versa.

A person skilled in the art will readily appreciate that various parameters disclosed in the description may be modified and that various embodiments disclosed may be combined without departing from the scope of the invention.

The invention claimed is:

1. A method for generating control signals for an image capture device, the method being performed in a communication device comprising a first slave time generator associated with a first clock and a second slave time generator associated with a second clock, the method comprising:
    synchronizing the first clock with a reference time of a first remote time server to which the communication device is connected;
    synchronizing the second clock with a reference time of a second remote time server to which the communication device is connected;
    generating a first control signal based on the first clock, and sending the first control signal to the image capture device;
    upon detecting a loss of synchronization between the first slave time generator and the first remote time server, generating a second control signal based on the second clock, and sending the second control signal to the image capture device.

2. The method of claim 1, wherein the first control signal and the second control signal are synchronization signals generated according to an SMPTE 2059 standard.

3. The method of claim 1, wherein the first remote time server and the second remote time server are a same remote time server.

4. The method of claim 1, wherein the first remote time server and the second remote time server are two different remote time servers.

5. The method of claim 4, wherein the first remote time server and the second remote time server are synchronized with a different time source, wherein the method further comprises:
    obtaining a time value function of a difference between a time of the first remote time server and a time of the second remote time server;
    wherein the second control signal is further generated based on the obtained time value.

6. The method of claim 1, further comprising, after the loss of synchronization between the first slave time generator and the first remote time server:
    receiving, at the first slave time generator, a message from the second remote time server indicating that a communication link between the first slave time generator and the second remote time server is established; and
    upon the receiving of the message, synchronizing the first clock associated with the first slave time generator with the reference time of the second remote time server.

7. The method of claim 1, further comprising, after the loss of synchronization between the first slave time generator and the first remote time server:
    receiving, at the first slave time generator, a message from the second remote time server indicating that a communication link between the first slave time generator and the second remote time server is established; and
    determining if a communication link between the first slave time generator and another remote time server distinct from the second remote time server is established before expiration of a predetermined amount of time:
    if, before expiration of the predetermined amount of time, the communication link between the first slave time generator and another remote time server distinct from the second remote time server is established, synchronizing the first clock with a reference time of the other remote time server,
    otherwise, synchronizing the first clock with a reference time of the second remote time server.

8. The method of claim 1, further comprising:
    detecting a loss of synchronization between a slave time generator among the first slave time generator and the second slave time generator and a respective remote time server,
    upon the detecting, determining whether the clock associated with the other slave time generator is synchronized with a reference time of any remote time server;
    if the clock associated with the other slave time generator is synchronized with a reference time of any remote time server, generating a third control signal based on the synchronized clock; and
    otherwise, generating a third control signal independently from the first clock and the second clock; and
    sending the third control signal to the image capture device.

9. The method of claim 8, wherein the first clock is not synchronized with any remote time server, the method further comprising:
    receiving data indicating a synchronization recovery between any clock among the first clock and the second clock and a reference time of any time server to which the communication device is connected; and
    upon the receiving of the data, generating a control signal based on this clock, and sending the control signal to the image capture device.

10. The method of claim 1, wherein the first clock and the second clock are synchronized with a reference time of a same remote time server, wherein a control signal is generated based on a clock among the first clock and the second clock, the method further comprising:
    receiving, at a given slave time generator among the first slave time generator and the second slave time generator and distinct from the slave time generator associated with the clock based on which the control signal is generated, a message from another remote time server distinct from the remote time server with which the first clock and the second clock are synchronized,
    the message indicating that a communication link between the given slave time generator and the other remote time server is established; and
    upon the receiving of the message, synchronizing the clock associated with the given slave time generator with a reference time of the other remote time server.

11. The method of claim 1, wherein a given slave time generator among the first slave time generator and the second slave time generator is connected to two distinct time servers via two respective communication links, the method further comprising:
  selecting a remote time server among the two distinct remote time servers to which the given slave time generator is connected; and
  synchronizing the clock of the given slave time generator with a reference time of the selected remote time server.

12. The method of claim 11, wherein the selection of the remote timer server is based on a predefined set of rules.

13. The method of claim 4, further comprising, after the loss of synchronization between the first slave time generator and the first remote time server:
  receiving, at the first slave time generator, a message from the second remote time server indicating that a communication link between the first slave time generator and the second remote time server is established; and
  upon the receiving of the message, synchronizing the first clock associated with the first slave time generator with the reference time of the second remote time server.

14. The method of claim 5, further comprising, after the loss of synchronization between the first slave time generator and the first remote time server:
  receiving, at the first slave time generator, a message from the second remote time server indicating that a communication link between the first slave time generator and the second remote time server is established; and
  upon the receiving of the message, synchronizing the first clock associated with the first slave time generator with the reference time of the second remote time server.

15. The method of claim 5, further comprising, after the loss of synchronization between the first slave time generator and the first remote time server:
  receiving, at the first slave time generator, a message from the second remote time server indicating that a communication link between the first slave time generator and the second remote time server is established; and
  determining if a communication link between the first slave time generator and another remote time server distinct from the second remote time server is established before expiration of a predetermined amount of time:
  if, before expiration of the predetermined amount of time, the communication link between the first slave time generator and another remote time server distinct from the second remote time server is established, synchronizing the first clock with a reference time of the other remote time server,
  otherwise, synchronizing the first clock with a reference time of the second remote time server.

16. The method of claim 5, wherein the first clock and the second clock are synchronized with a reference time of a same remote time server, wherein a control signal is generated based on a clock among the first clock and the second clock, the method further comprising:
  receiving, at a given slave time generator among the first slave time generator and the second slave time generator and distinct from the slave time generator associated with the clock based on which the control signal is generated, a message from another remote time server distinct from the remote time server with which the first clock and the second clock are synchronized,
  the message indicating that a communication link between the given slave time generator and the other remote time server is established; and
  upon the receiving of the message, synchronizing the clock associated with the given slave time generator with a reference time of the other remote time server.

17. The method of claim 5, wherein a given slave time generator among the first slave time generator and the second slave time generator is connected to two distinct time servers via two respective communication links, the method further comprising:
  selecting a remote time server among the two distinct remote time servers to which the given slave time generator is connected; and
  synchronizing the clock of the given slave time generator with a reference time of the selected remote time server.

18. The method of claim 17, wherein the selection of the remote timer server is based on a predefined set of rules.

19. A communication device for generating control signals for an image capture device, the communication device being connected to a first remote time server and a second remote time server, the communication device comprising:
  a first slave time generator configured for synchronizing a first clock with a reference time of the first remote time server;
  a second slave time generator configured for synchronizing a second clock with a reference time of the second remote time server;
  a control signal generator configured for generating a first control signal based on the first clock;
  an output interface configured for sending the first control signal to the image capture device;
  a synchronization controller for detecting a loss of synchronization between the first slave time generator and the first remote time server;
  wherein the synchronization controller is further configured for causing, upon detecting the loss of synchronization between the first slave time generator and the first remote time server, the control signal generator to generate a second control signal based on the second clock;
  wherein the output interface is further configured for sending the second control signal to the image capture device.

20. A non-transitory computer-readable storage medium storing a program for causing a computer to execute a method for generating control signals for an image capture device, the method being performed in a communication device comprising a first slave time generator associated with a first clock and a second slave time generator associated with a second clock, the method comprising:
  synchronizing the first clock with a reference time of a first remote time server to which the communication device is connected;
  synchronizing the second clock with a reference time of a second remote time server to which the communication device is connected;
  generating a first control signal based on the first clock, and sending the first control signal to the image capture device;
  upon detecting a loss of synchronization between the first slave time generator and the first remote time server, generating a second control signal based on the second clock, and sending the second control signal to the image capture device.

* * * * *